US009122700B2

(12) United States Patent
Grider et al.

(10) Patent No.: US 9,122,700 B2
(45) Date of Patent: Sep. 1, 2015

(54) PARALLEL LOG STRUCTURED FILE SYSTEM COLLECTIVE BUFFERING TO ACHIEVE A COMPACT REPRESENTATION OF SCIENTIFIC AND/OR DIMENSIONAL DATA

(71) Applicants: Los Alamos National Security, LLC, Los Alamos, NM (US); UT-Battelle, LLC, Oak Ridge, TN (US)

(72) Inventors: Gary A. Grider, Los Alamos, NM (US); Stephen W. Poole, Knoxville, TN (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/722,946

(22) Filed: Dec. 20, 2012

(65) Prior Publication Data
US 2013/0159364 A1  Jun. 20, 2013

Related U.S. Application Data

(60) Provisional application No. 61/578,117, filed on Dec. 20, 2011.

(51) Int. Cl.
    *G06F 17/30* (2006.01)
(52) U.S. Cl.
    CPC .... *G06F 17/30227* (2013.01); *G06F 17/30224* (2013.01)
(58) Field of Classification Search
    USPC .................................................. 707/696, 826
    See application file for complete search history.

(56) References Cited

U.S. PATENT DOCUMENTS

| 6,470,344 B1 * | 10/2002 | Kothuri et al. | 707/696 |
|---|---|---|---|
| 6,535,949 B1 * | 3/2003 | Parker | 711/103 |
| 7,681,122 B1 * | 3/2010 | Tsykora | 715/249 |
| 7,882,077 B2 * | 2/2011 | Gokhale et al. | 707/673 |
| 8,005,836 B2 * | 8/2011 | Ramesh et al. | 707/736 |
| 8,065,293 B2 * | 11/2011 | Mukerjee et al. | 707/711 |
| 8,074,219 B2 * | 12/2011 | Duffy et al. | 718/100 |
| 2005/0267929 A1 * | 12/2005 | Kitamura | 709/201 |
| 2006/0101025 A1 | 5/2006 | Tichy et al. | |
| 2008/0005547 A1 | 1/2008 | Papakipos et al. | |

(Continued)

FOREIGN PATENT DOCUMENTS

WO    WO 2013/096667    6/2013

OTHER PUBLICATIONS

Bent et al., "PLFS: a checkpoint filesystem for parallel applications," *Proceedings of the Conference on High Performance Computing Networking, Storage and Analysis* (SC '09), 12 pages (Nov. 2009).

(Continued)

*Primary Examiner* — Kim Nguyen
(74) *Attorney, Agent, or Firm* — Klarquist Sparkman, LLP

(57) ABSTRACT

Collective buffering and data pattern solutions are provided for storage, retrieval, and/or analysis of data in a collective parallel processing environment. For example, a method can be provided for data storage in a collective parallel processing environment. The method comprises receiving data to be written for a plurality of collective processes within a collective parallel processing environment, extracting a data pattern for the data to be written for the plurality of collective processes, generating a representation describing the data pattern, and saving the data and the representation.

19 Claims, 25 Drawing Sheets

(56) References Cited

U.S. PATENT DOCUMENTS

2009/0106255 A1 4/2009 Lacapra et al.
2011/0282832 A1* 11/2011 Rishel et al. .................. 707/609

OTHER PUBLICATIONS

Argonne National Laboratory, "ROMIO: A High-Performance, Portable MPI-IO Implementation," <http://www.mcs.anl.gov/research/projects/romio/>, 4 pages (accessed Dec. 17, 2012).

"MPICH Overview," <http://www.mpich.org/about/overview/>, 2 pages (accessed Dec. 17, 2012).

International Search Report and Written Opinion, International Application No. PCT/US2012/071041, 7 pp. (Mar. 18, 2013).

Tian et al., "EDO: Improving Read Performance for Scientific Applications Through Elastic Data Organization," presented at the *2011 IEEE International Conference on Cluster Computing*, 10 pp. (Sep. 26-30, 2011).

* cited by examiner

FIG. 8
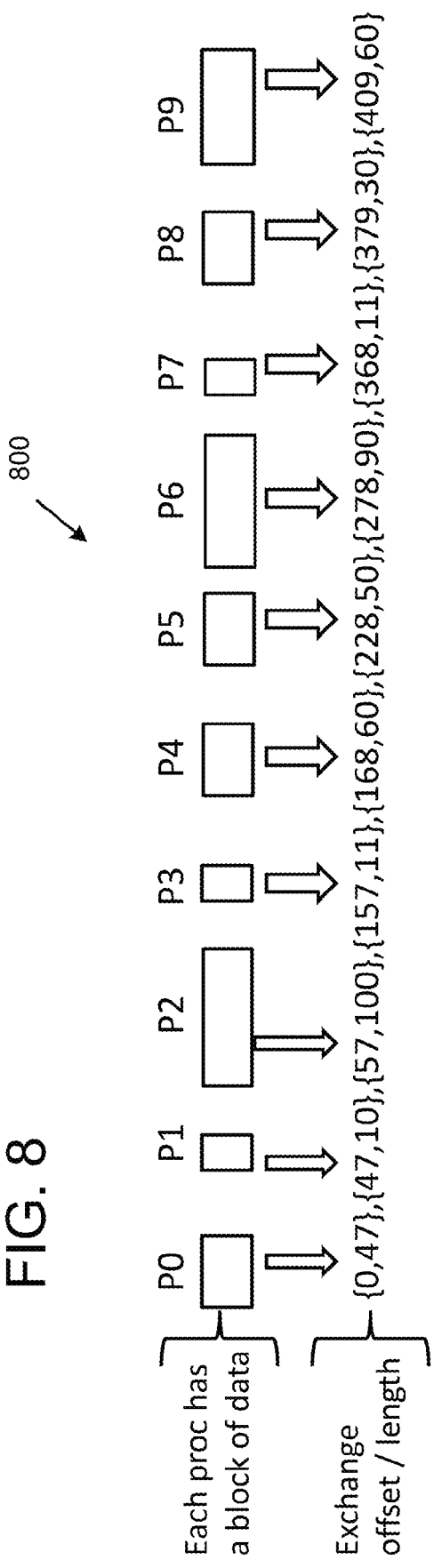
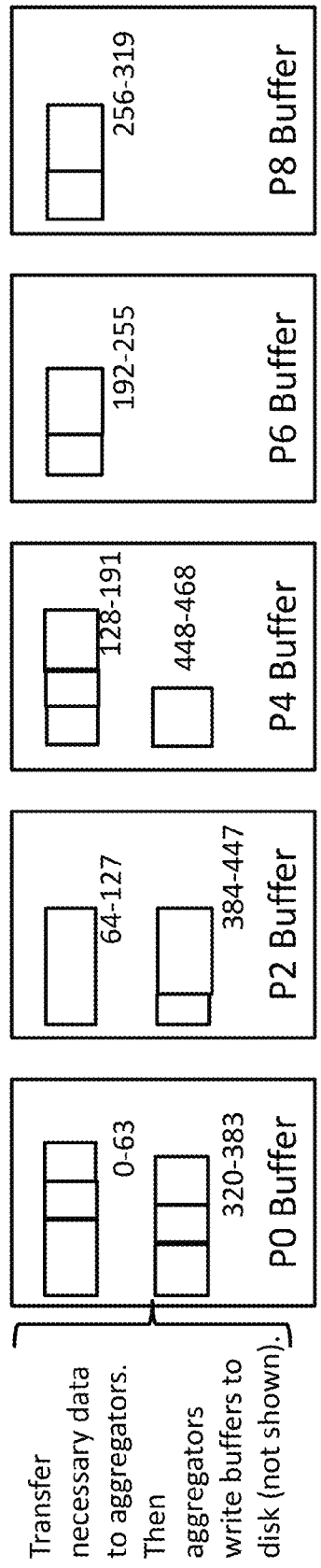

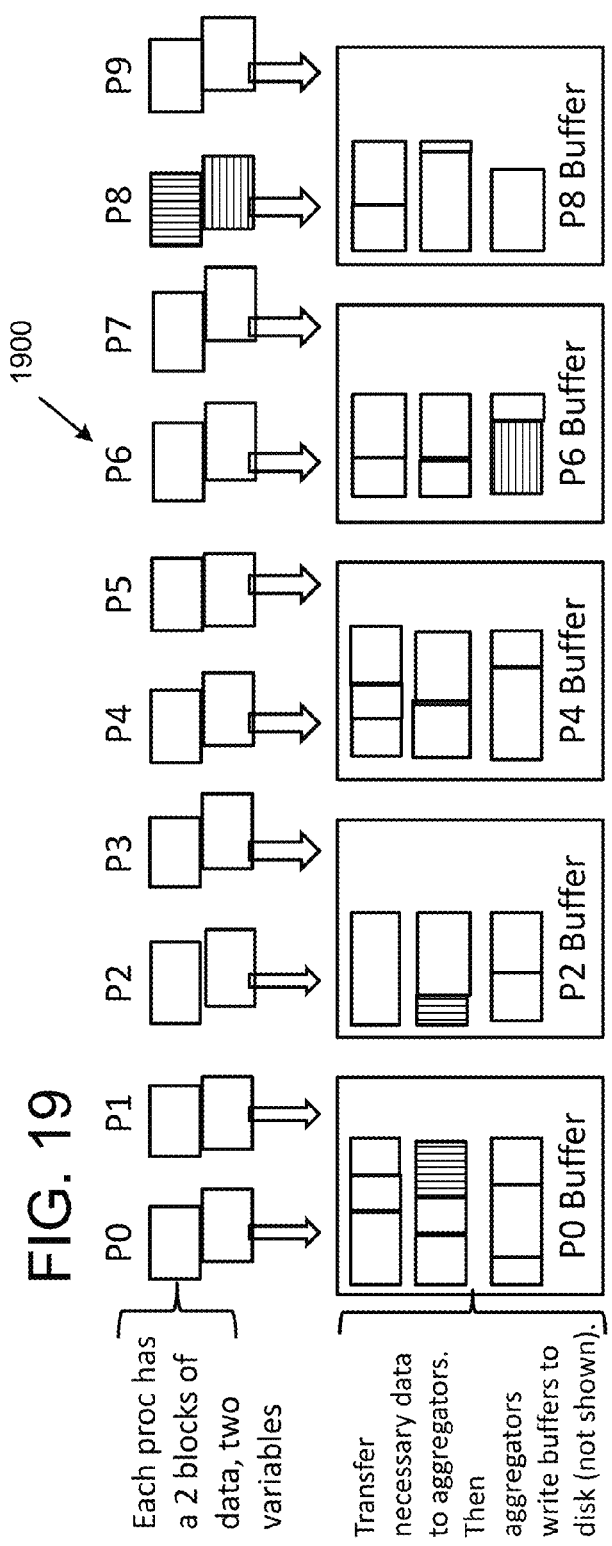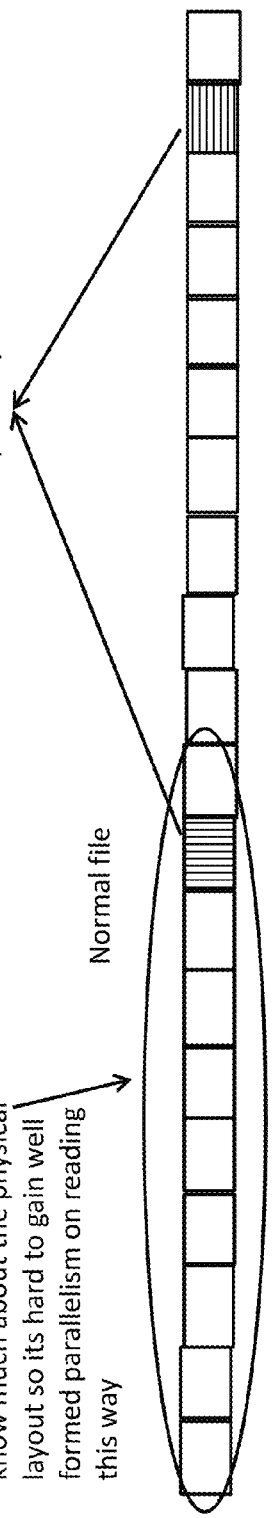
FIG. 19

Each proc has a 2 blocks of data, two variables

Only data moves on node

All the variables for a computational cell in the same log file

N0

N1

Log file 0

Log file 1

To read all of the values of the first variable in each cell logically it looks like this The index formula tells you to thread out the read and have all the disks get these values in parallel To read all variables of a computational Cell, the index tells you which log file, all the variables for that cell are there, so retrieving several cells can be optimized for parallelism Logically reading all the values of a cell Logical View of File

SOFTWARE 2580 FOR TECHNOLOGY
DESCRIBED IN EXAMPLE(S)

PARALLEL LOG STRUCTURED FILE SYSTEM COLLECTIVE BUFFERING TO ACHIEVE A COMPACT REPRESENTATION OF SCIENTIFIC AND/OR DIMENSIONAL DATA

CROSS-REFERENCE TO RELATED APPLICATION

This application claims the benefit of U.S. Provisional Application No. 61/578,117, which was filed on Dec. 20, 2011 and is incorporated herein by reference in its entirety.

ACKNOWLEDGMENT OF GOVERNMENT SUPPORT

This invention was made with government support under Contract No. DEAC52-06NA25396 awarded by the U.S. Department of Energy. The government has certain rights in the invention.

BACKGROUND

Current techniques for capturing representations of scientific data as it is stored to stable storage requires scientific applications to use specific application programming interfaces (APIs) such as SQL, NetCDF, HDF5, and SciDB. These APIs each store their data in their own format. Additionally, in a large scale parallel setting, each of these techniques often requires a large percentage of the data to be shuffled around before storing the data to make it efficient for the underlying storage.

The Parallel Log-structured File System (PLFS) was created to break the need for scientific parallel applications to have to align their data for enabling efficient use of the underlying storage system; PLFS breaks the need for these science applications to be concerned with alignment/locking issues. However, this insulation from the particulars of the underlying storage system comes at the cost of storing substantial mapping metadata along with the data.

Therefore, there exists ample opportunity for improvement in technologies related to data storage in a collective parallel processing environment.

SUMMARY

A variety of technologies related to data storage, retrieval, and/or analysis in a collective parallel processing environment are provided. For example, the technologies can be used in a high performance computing (HPC) environment that uses a parallel file system.

In the technologies described herein, various data pattern techniques and solutions and/or smart collective buffering techniques and solutions are applied. For example, the techniques and solutions described herein can include one or more of the following:
  Extracting data patterns and/or storage patterns from structured or unstructured data
  Generating representations and/or analytics from data patterns (e.g., from structured data to be written by collective processes)
  Storing representations (e.g., as compact index information, such as a single index entry or an algorithmic representation)
  Shuffling or moving data efficiently and/or optimally between collective processes or compute nodes (e.g., only between neighboring collective processes or compute nodes)
  Shuffling or moving data to create new data patterns (e.g., to create structured data from unstructured data)
  Saving data and representations using a parallel file system (e.g., PLFS)

A method can be provided for data storage in a collective parallel processing environment. The method comprises receiving data to be written for a plurality of collective processes within a collective parallel processing environment, extracting a data pattern for the data to be written for the plurality of collective processes, generating a representation describing the data pattern, and saving the data and the analytics enabling representation.

Features and advantages will become apparent from the following detailed description, which proceeds with reference to the accompanying figures.

BRIEF DESCRIPTION OF THE DRAWINGS

FIG. 8 is a diagram depicting MPI-IO collective buffering.

FIG. 19 is a diagram depicting regular collectives.

FIG. 20 is a diagram depicting PLFS collectives.

DETAILED DESCRIPTION

Figure 1:
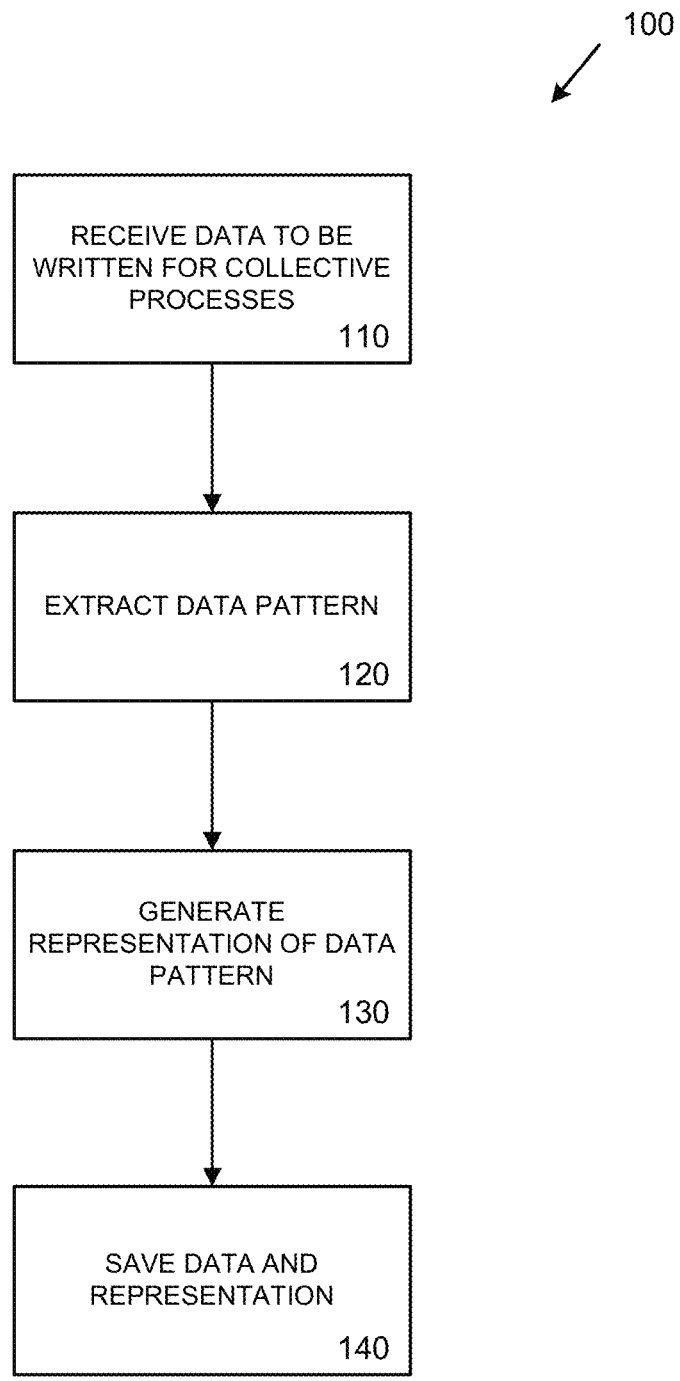
FIG. 1 is a flowchart depicting an example method for data storage in a collective parallel processing environment using collective buffering and data pattern techniques.

As described herein, various data pattern techniques and solutions and/or smart collective buffering techniques and solutions are applied. For example, the techniques and solutions can be applied to a parallel file system, such as the Parallel Log-structured File System. The techniques and solutions described herein can be applied to high-performance computing (HPC) and collective parallel processing in relation to storage, retrieval, and/or analysis of data, such as dimensional data, scientific data, and/or extreme scale databases.

In some implementations, data can be stored and/or accessed for multiple collective processes (e.g., in a collective parallel processing environment). For example, data can be stored or accessed for a plurality of collective processes using a parallel file system. Techniques and solutions can be applied for creating and storing representations of data (e.g., in a compact format) and analytical methods and derived metadata associated with that data and representation that are generated based on data patterns. Techniques and solutions can be applied for smart collective buffering which can, for example, move data efficiently between processes (e.g., neighboring collective processes) to create structure or patterns which can then be represented in a compact manner.

In some embodiments, the Parallel Log-structured File System (as described in Bent et al., "PLFS: a checkpoint filesystem for parallel applications," *Proceedings of the Conference on High Performance Computing Networking, Storage and Analysis* (SC '09). ACM, New York, N.Y., USA, 12 pages, 2009) is extended to implement data pattern techniques and solutions and/or smart collective buffering techniques and solutions described herein. This PLFS approach provides the ability to capture a compact representation (e.g., similar in concept to a database schema). This approach combines the ability to capture the compact representation in a way that is agnostic to the application programming interface (API) (e.g., any API can easily be accommodated) and also in a way that is agnostic to the actual format of the data being stored. Additionally, this approach accomplishes the above in a way that drastically reduces the amount of data required to be shuffled around for efficient use of the underlying storage.

In a specific embodiment, the PLFS smart collective buffering/data pattern approach is implemented as follows: a PLFS abstract I/O interface (ADIO) layer is written for Message Passing interface parallel I/O (MPI-IO) (e.g., which can be the ROMIO MPI-IO implementation provided by Argonne National Laboratory, and as included in the MPICH2 implementation of the Message Passing Interface (MPI) standard developed by Argonne National Laboratory) which enables PLFS to handle collective write/read requests to underlying storage. In this layer, collective operations are done to determine lengths and offsets of requested data (writes and reads). Logic is inserted into this collective read/write code path to capture information about repeating patterns in the data requests and convert those patterns to a compact formula that is then passed to PLFS to use as a map of where data is located. Additionally, the collective data operations can be optimized for PLFS so that minimal data is needed to be shuffled between parallel processes to make for an efficient compact representation to be utilized.

Some potential benefits of PLFS collective buffering and/or data pattern include:

1) drastically reduced metadata in PLFS making reading very efficient 2) an API agnostic way to capture compact representation 3) a storage format independent way to capture compact representation 4) a way to capture compact representation in parallel with much smaller amount of data shuffling 5) a way to automatically subdivide large amounts of data (e.g., scientific and/or dimensional data) that allows for easy parallel analysis As used herein, the term "collective buffering" (sometimes referred to as "smart collective buffering") refers to the various collective buffering and/or data pattern techniques and solutions described herein (e.g., efficient shuffling or moving of data between collective processes or compute nodes, creating structured data patterns, recognizing data patterns, creating compact representations and/or index information, etc.). The collective buffering techniques and solutions described herein can be applied to parallel file system technology, including PLFS. As should be understood, the collective buffering (or collective buffering and/or data pattern) techniques and solutions described herein are different from "MPI-IO collective buffering" that uses a different method for moving data between processes and moves data for a different purpose (e.g., to align to the underlying file/storage system).

Other high performance computing parallel run time environments such as Partitioned Global Address Space (PGAS) and the associated PGAS languages such as Unified Parallel C (UPC), Co-Array Fortran (CAF), X10, and Chapel, also are used to express data structure to a parallel computing system and can provide this structure to enable pattern discovery and all the benefits mentioned above.

Parallel Log-Structured File System

For decades the performance of database management systems has greatly benefited from two strategies: (1) decoupling logical data models from physical data representation, and (2) sharing structure of data between applications and database management systems via compact descriptions called "schemas." Yet, in file based storage systems neither strategy has been adopted. File storage systems implement a byte stream data model that tightly maps to physical data structures making performance highly sensitive to access patterns and have made it difficult to share the structure of data between applications and storage systems.

The Parallel Log-structured File System (PLFS) provides an interposition layer that works with any standard file system that implements the first strategy: it decouples logical access patterns from physical access patterns, with the result of up to two orders of magnitude performance improvement for several example HPC applications. PLFS allows applications to access data in "virtual" files that it implements as data in the form of directories of write-optimized logs and indices. These indices are used by PLFS to provide read access to virtual files. The size of these indices is proportional to the number of processes writing to a virtual file. For the billions of processes expected in exascale HPC systems, these indices become large, which can make scaling PLFS read access difficult.

PLFS Collective Buffering/Data Pattern

Collective buffering and/or data pattern techniques can be applied to file system technology (e.g., parallel file system technology) to provide more efficient storage and retrieval of data.

In some embodiments, PLFS collective buffering and data pattern techniques are applied to the second strategy for storage systems discussed in the above section: sharing compact descriptions of the structure of data among applications and file systems that can be called "fs-schemas." 'These fs-schemas can replace PLFS' indices and therefore make PLFS' read access scalable to exascale and beyond, they can significantly reduce the communication overhead for coordinating collective I/O, and they allow for transformation and analysis of the data on all levels of the memory hierarchy because the structure of data is well-known throughout.

In a specific embodiment, MPI-IO collective write functions can be extended to capture write patterns on the fly and those patterns can be used to build an index that represents the write data placement. The patterns can be used to build an index that represents the data write placement that is orders of magnitude smaller than the list style index used by PLFS. Furthermore, data shuffling can be performed in a more efficient way than used by MPI-IO due to the freedom PLFS provides by removing the need for alignment to the underlying storage system. PLFS can then be extended to perform collective buffering (different in data movement than the "collective buffering" performed by MPI-IO), including using the data patterns to perform data shuffling. The result of these techniques can be a compact representation of extremely large amounts of data derived on the fly and used for looking up where data is located in the write pattern. In addition, these techniques can be used to simplify analysis functions using the stored data.

In some implementations, one or more of the following operations are performed:
1) Parallel application has distributed data/arrays etc. in memories of nodes in a computing cluster or other type of parallel computer.
2) Parallel application describes this data/array to MPI-IO in the usual way one does using the MPI-IO library.
3) Parallel application calls the write_all function of MPI-IO which tells the MPI-IO library to write this distributed data collectively (all processes writing simultaneously).
4) MPI-IO then calls into the new PLFS function that will perform PLFS collective buffered writes (which can be called PLFS collective writing).
5) This PLFS function will first do collective communications between all the processes across the cluster to inform all processes which process wants to write which data to where in the data file.
6) During this collective, the new PLFS library will extract the data pattern being written and build a formula to describe the write pattern if possible, and if not possible (or not desirable) this function will move data to neighboring compute nodes to enable a pattern and then extract that pattern.
7) This data movement or motion can be optimized so that very little data shuffling has to be done.
8) This pattern will then be passed into PLFS which will store data and this new pattern/formula/compact index representation, e.g., as fs-schemas).
9) This compact representation allows for extremely efficient lookups for subsequent reads of data through PLFS.
10) The compact representation can be used subsequently by programs that want to optimally analyze the data written because the compact representation helps readers of the data know where to read the desired data in an extremely efficient way.
11) Upon writing the data and the compact formula/index the application is notified that the write has occurred and then the application can go on about its business.
12) A similar operation flow could be applied to use with other HPC parallel run time facilities, such as PGAS, etc.

Example Data Storage in Collective Parallel Processing Environments

In the techniques and solutions described herein, methods, systems, and environments can be provided data storage in collective parallel processing environments using collective buffering and data pattern techniques.

FIG. 1 depicts an example method 100 for data storage in a collective parallel processing environment one or more of the collective buffering and data pattern techniques described herein. At 110, data to be written for a plurality of collective processes within a collective parallel processing environment is received. For example, the data can be received from each process individually or it can be received from one or more compute nodes (each compute node providing data from one or more collective processes). For example, a collective process can be designated as an aggregator within each compute node and the aggregator processes can provide the data for all collective processes in its respective compute node. The data to be written can be data generated within a collective parallel processing environment where the collective processes within the environment are operating on a set of data with a regular pattern of structure (e.g., a distributed structure across the collective processes).

At 120, a data pattern is extracted (discovered) from the data (e.g., before or after the data is received) to be written 110. For example, the data pattern can be based upon structured data to be written (e.g., each collective process may be operating on the same size of data, such as the same number of floating point values or the same quantity of a complex data structure). In some implementations, the data pattern is discovered before any actual data is received from (or sent by) the collective processes. For example, a data write operation can include a communication phase where the pattern (or lack thereof) can be discovered. Once the pattern is discovered or extracted, it can be used to determine where data can be moved to create an efficient pattern (e.g., by shuffling or data between neighboring collective processes).

In some situations, the data to be written may be unstructured (e.g., the collective processes may be operating on different amounts of data). In such situations, the data to be written may be moved between neighboring collective processes and/or neighboring compute nodes in order to create a pattern (e.g., to create structured data). Once the data has been moved, the pattern can be extracted 120.

At 130, a representation of the data pattern is generated (e.g., an originally extracted or discovered data pattern or a pattern after the data has been shuffled or restructured). For example, the representation can comprise information describing the number of processes, the offset in the files being written for the current write, the total amount of data being written, the amount of data being written per process or per compute node, and/or the number of compute nodes, etc. The representation can also comprise information describing the structure (e.g., complex structure) of the data. For example, the data structure may be a distributed array of 1,000 floating point values across 10 collective processes (with each process operating on 100 floating point values from the array).

The representation can be a single index entry (e.g., a single PLFS index entry) describing the data being written and stored for all the collective processes (e.g., millions or billions of collective processes). By recognizing the pattern in structured data (or shuffling/moving data to create structured data or a data pattern), a compact representation can be created (e.g., separate index information or meta data does not need to be created for the data written/saved for each process and/or each compute node). For example, if there are a million collective processes each writing their own data, a compact representation (e.g., a one dimensional index entry) can be used with the collective buffering and data pattern techniques described herein instead of, for example, a million separate index entries for a PLFS implementation that does not use the collective buffering and data pattern techniques described herein.

At 140, the data and representation are saved. For example, the data and representation can be saved using PLFS or another type of parallel file system. Once saved, reading or analysis of the saved data can be performed efficiently by reading the compact index information in the saved representation.

Figure 2:
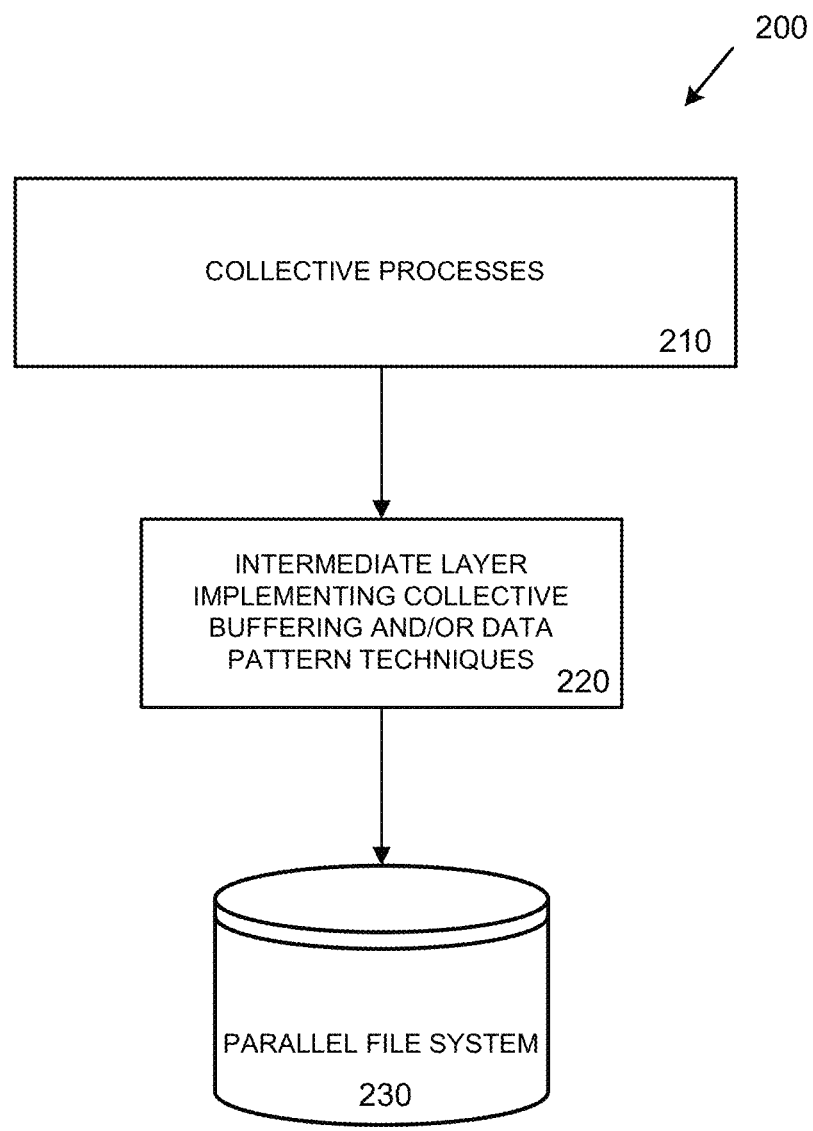
FIG. 2 is a diagram depicting an example collective parallel processing environment for data storage using collective buffering and data pattern techniques.

FIG. 2 is a diagram depicting an example collective parallel processing environment 200 for data storage using collective buffering and data pattern techniques. The environment 200 includes collective processes 210. For example, the collective processes 210 can be a set of collective processes involved in a HPC environment.

The environment 200 includes an intermediate layer 220 implementing any of the collective buffering and/or data pattern techniques described herein. For example, the intermediate layer 220 can analyze data to be written by the collective processes 210 (e.g., to determine whether the data is structured or unstructured), move or shuffle data between the collective processes (e.g., between neighboring collective processes and/or between neighboring compute nodes), extract data patterns from the data to be written, generate representations of the data based on the pattern (e.g., generate compact index information, such as a single index entry), and store the data and representation using data storage, such as the parallel file system 230.

In some embodiments, the intermediate layer 220 can comprise extensions to MPI-IO and/or PLFS.

Example High Performance Computing Concepts

This section describes various concepts involved with high-performance computing (HPC) and collective parallel processing in relation to storage, retrieval, and/or analysis of data. Some of the concepts involve data structures used with HPC applications, jitter, structured and unstructured data, MPI-I/O collective buffering, and standard PLFS.
  What do HPC Apps do?
  Cooperative simulation of a physical space
  Create a logical data structure to represent information
  Distribute pieces of data structure across processes
  Each piece can be same or different size
    (i.e. structured or unstructured)

Figure 3:
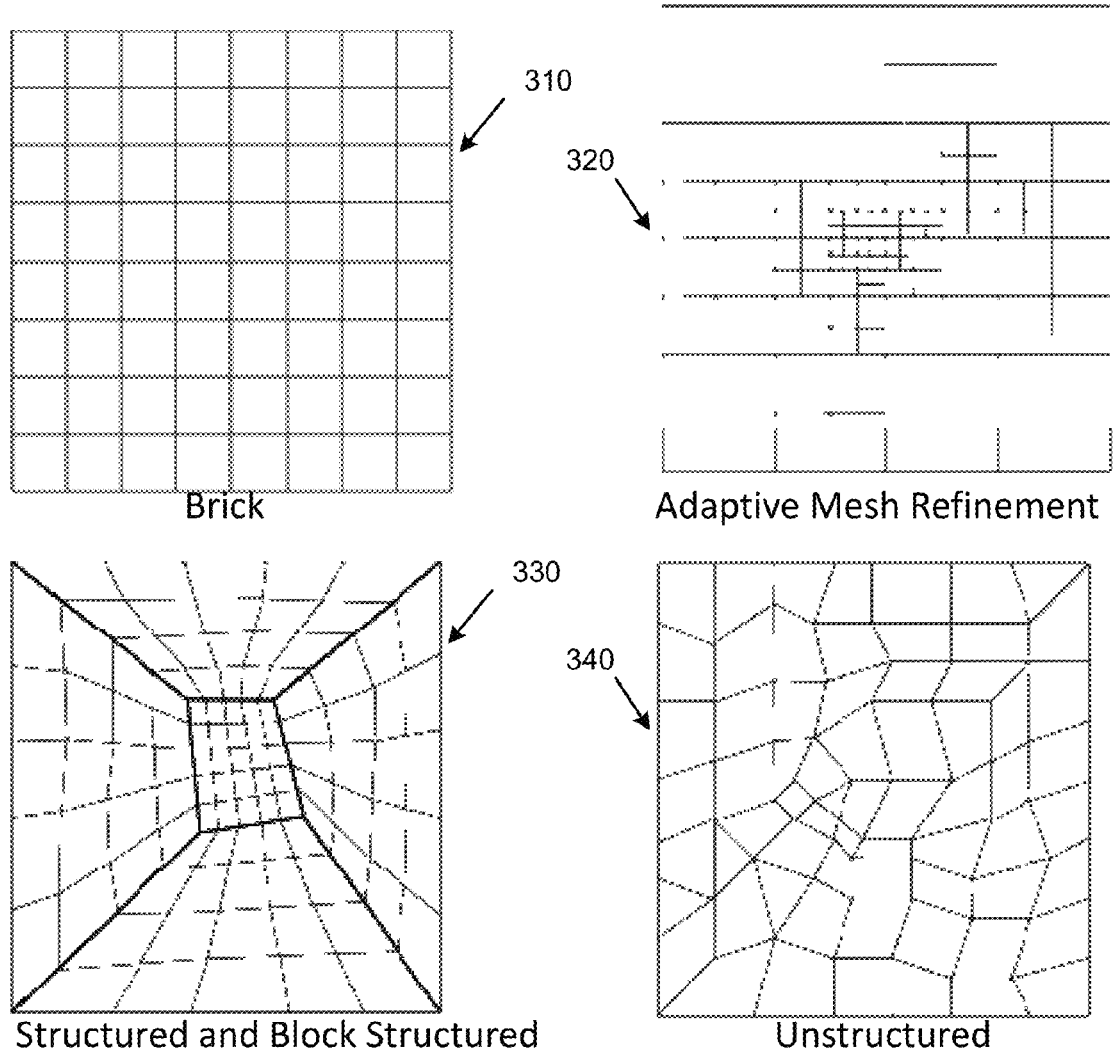
FIG. 3 is a diagram depicting examples of data structure distributions.

FIG. 3 is a diagram depicting examples of 2-dimensional (2D) data structure distributions, including a "brick" distribution 310, an "adaptive mesh refinement" distribution 320, a "structured and block structured" distribution 330, and an "unstructured" distribution 340.

Working Example

Imagine we are simulating a cubic meter. We could create a structured distribution of 1M (one million) cubic centimeters, and then assign one process for each centimeter. The processes simulate their centimeter and then they exchange data. They repeat this multiple times per second. The processes also checkpoint their data at a frequency of once per hour, for example. The data exchange and the checkpoints are necessarily synchronous in this example, but the compute is not.

Figure 4:
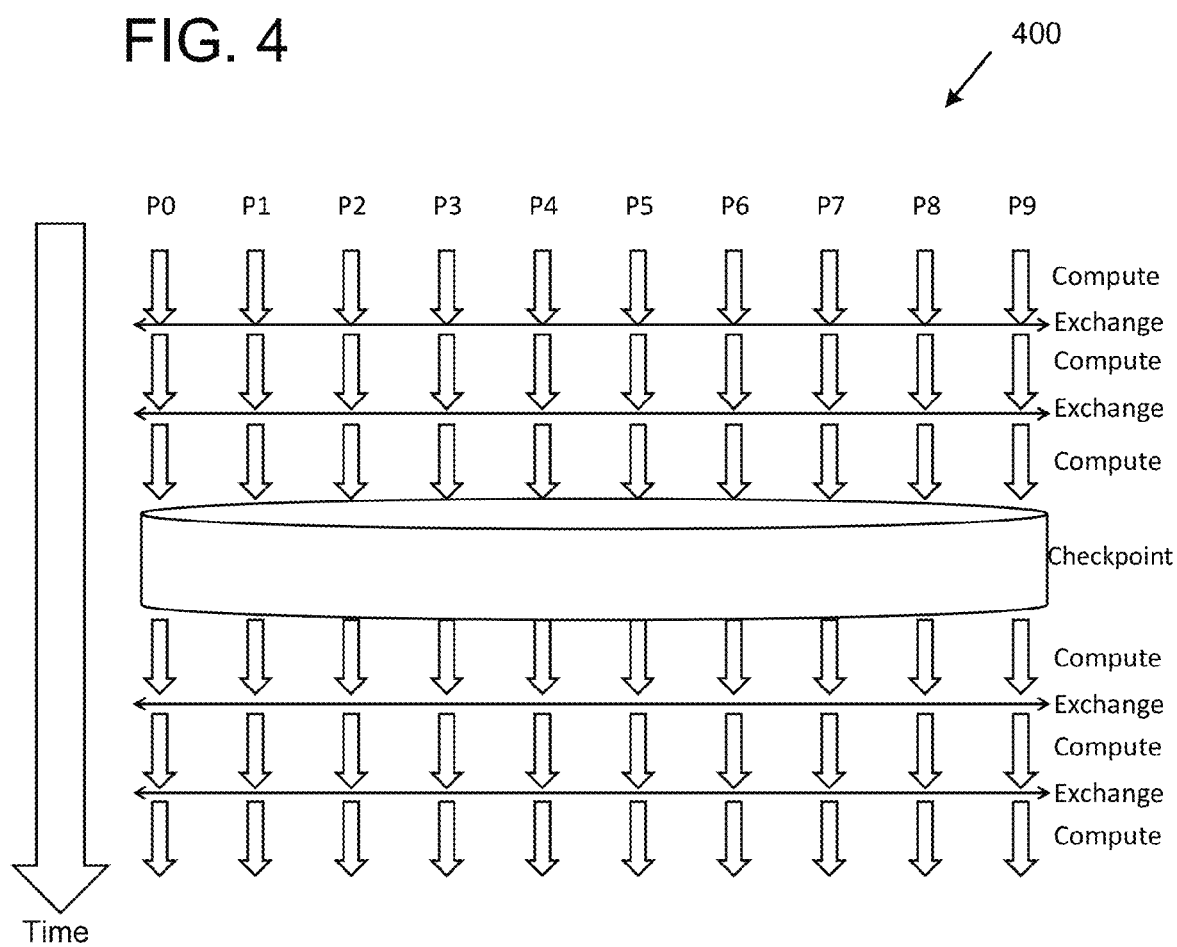
FIG. 4 is a diagram depicting synchronized processes.

A first version of this example is illustrated, in simplified format, in FIG. 4. In FIG. 4 at 400, ten processes (P0 through P9) are depicted, with their corresponding compute, exchange, and checkpoint operations. As depicted at 400, when the processes are nicely synchronized, compute, exchange, and checkpoint operations can be performed efficiently.

Figure 5:
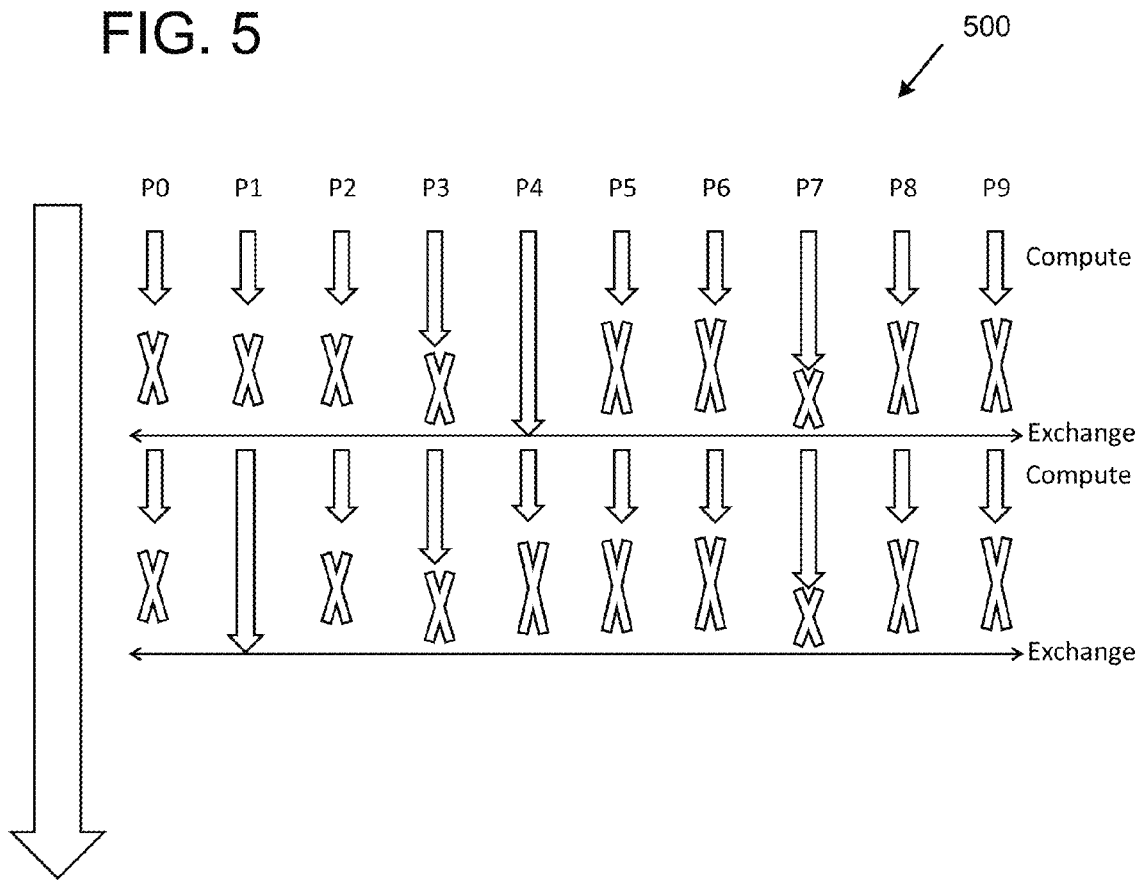
FIG. 5 is a diagram depicting unsynchronized processes.

A second version of this example is illustrated, in simplified format, in FIG. 5. In FIG. 5 at 500, ten processes (P0 through P9) are depicted, with their corresponding compute, exchange, and checkpoint operations. As depicted at 500, when the processes are not synchronized, compute, exchange, and checkpoint operations are inefficient. This effect can be called "jitter." For example, with reference to 500, in the first compute phase, P4 is very slow. The other processes are faster, and have to wait until P4 is done in order to do the exchange phase. In the second compute phase, P1 is the slow one. All of the X's indicate lost cycles where a process was occupying an expensive processor core but not using it.

What can Cause Jitter?

Remember the example cubic meter that is split into 1M (one million) cubic centimeters distributed to 1M cores. Imagine that there is a lot of activity within some cubic centimeters (dense subcubes) and not a lot within others (sparse subcubes). The cores operating on dense subcubes are slow getting to the exchange phase. The cores operating on sparse subcubes are fast getting to the exchange phase. For example, jitter can causes 30% to 50% lost utilization on a $200M supercomputer.

Avoiding Jitter

One way to avoid or reduce jitter is to make the subcubes uniformly populated with activity (and therefore irregularly sized). Processing time per subcube is thus uniform (or more uniform), processes arrive simultaneously (or nearly simultaneously) at exchanges, and jitter is reduced.

Unstructured Data to Reduce Jitter

Using unstructured data reduces jitter, but makes checkpointing harder. With unstructured data, subcubes are irregularly sized. Writing them in N-1 strided is very difficult. N-N would be good but N-N doesn't match the compute model very well. This introduces big headaches for archive, N-M restart, visualization and analysis. N-1 segmented would be ok but also doesn't match the compute model very well, and also introduces big headaches for N-M restart, visualization and analysis. N-1 strided is very hard with unstructured data because the writes are not uniformly sized over space or time.

In the future, memory per process looks like it will go down. Memory may become the most precious part of the system, which may mean that all codes will be structured. Therefore, an I/O approach may be needed that works well at immense scale (one million to one billion processes) for both unstructured/Adaptive Mesh Refinement (AMR) and structured data.

Example PLFS Data Pattern and Collective Buffering Implementations

This section describes various techniques for applying data pattern solutions and/or collective buffering solutions to PLFS. The techniques described below can be applied to high-performance computing (HPC) and collective parallel processing in relation to storage, retrieval, and/or analysis of data. The techniques described below can be used separately or in combination (e.g., in combination with the techniques described in this section and/or in combination with techniques described elsewhere herein).

For example, the techniques described below can be used if the regular PLFS index is too large to efficiently read/distribute. For example, PLFS collective buffering techniques described below can be applied to reduce the regular PLFS index to a very small fraction of its regular size. In addition, the techniques described below can be applied to optimize reads and facilitate analysis.

PLFS Independent Writing

Figure 6:
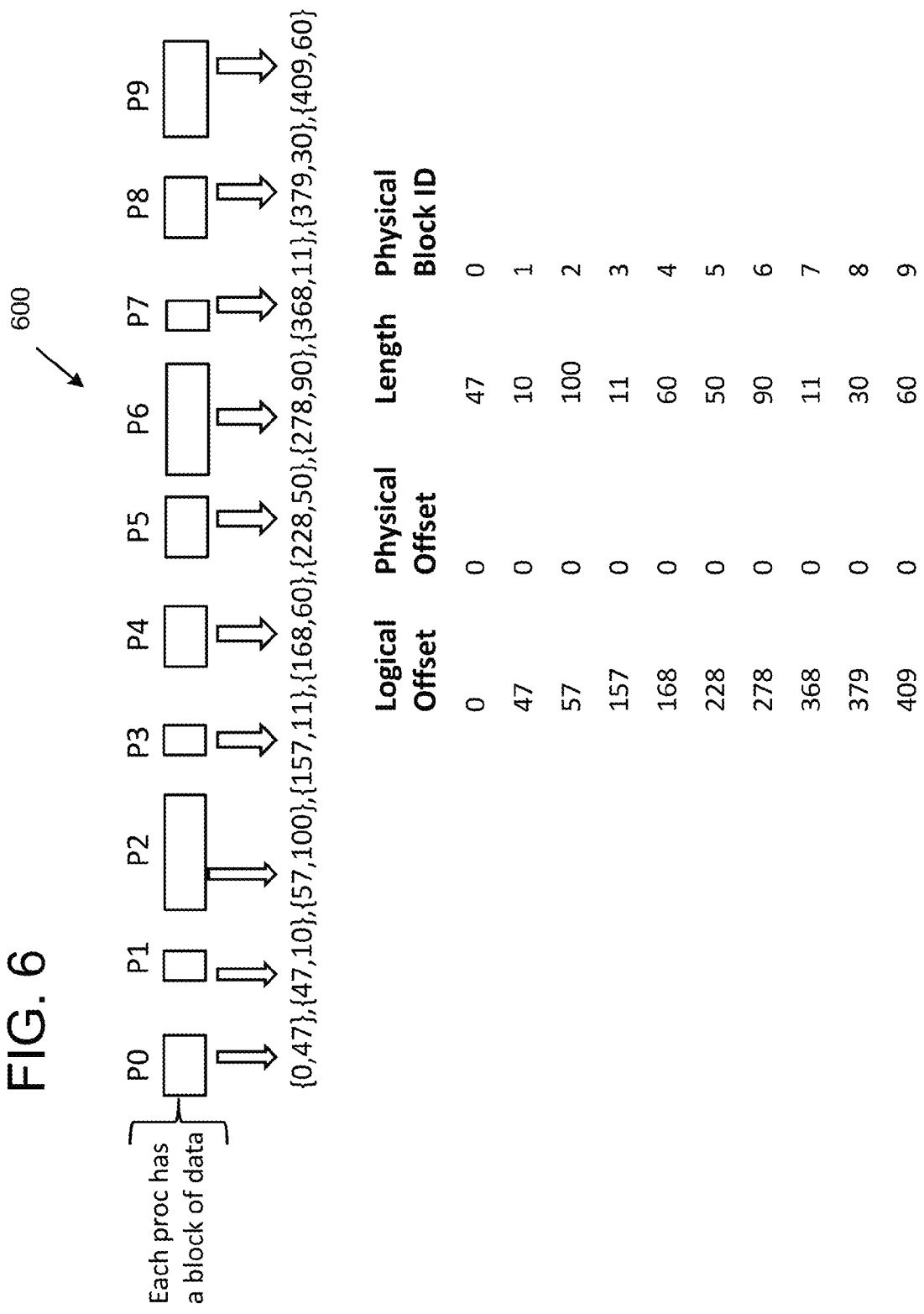
FIG. 6 is a diagram depicting PLFS independent writing.

FIG. 6 is an example diagram 600 depicting PLFS independent writing. In the diagram 600, PLFS writes each block to a unique physical file (one log structured file per process) and remembers where data is with an index (P0 data begins at index 0, P1 data begins at index 47, and so on). As depicted in the diagram 600, each block may have a different amount of data to write (e.g., P0 data length is 47, P1 data length is 10, P2 data length is 100, and so on). If every write were the same size (i.e. the writes were structured), then just one index entry could be saved identifying the pattern instead of one entry per write.

PLFS: Simple Types (Byte/Int/Float) N to 1 Unstructured Pattern

Figure 7:
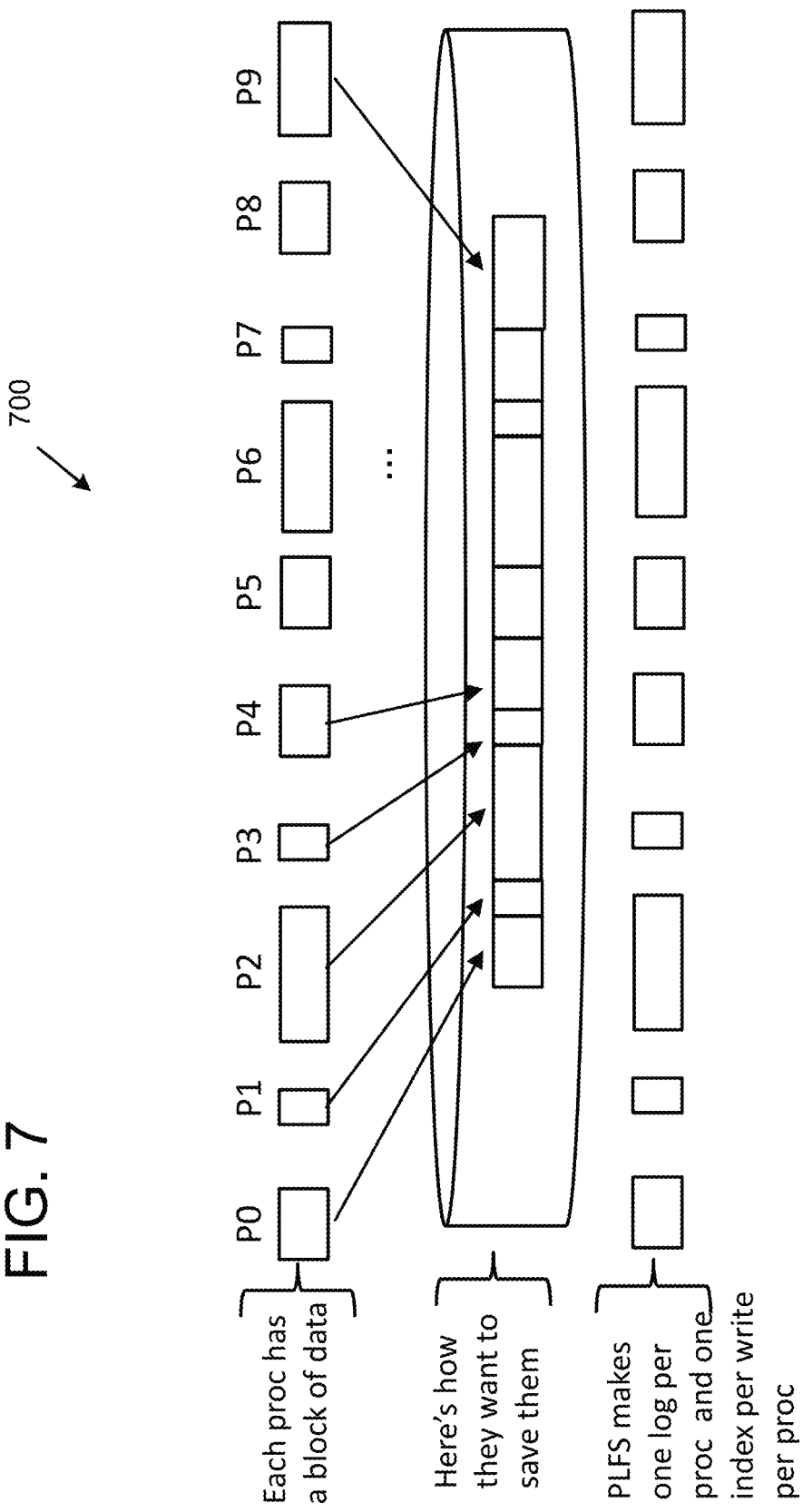
FIG. 7 is a diagram depicting PLFS N to 1 unstructured pattern.

FIG. 7 is an example diagram 700 depicting PLFS N to 1 unstructured pattern. In the diagram 700, PLFS makes one log per proc (process) and one index entry per write per process. This straight N-1 strided solution to a parallel file system (PFS) results in very poor storage bandwidth. PLFS can solve this by transforming transparently to N-N, but at a cost of large meta-data (the standard PLFS index can be huge) which hurts read times (e.g., when reading one index entry per write).

MPI-IO Collective Buffering

FIG. 8 is an example diagram 800 depicting "MPI-IO collective buffering" (note that "MPI-IO collective buffering" uses a different method for moving data between processes and moves data for a different purpose (e.g., to align to the underlying file/storage system) than the PLFS collective buffering techniques described herein).

MPI-IO collective buffering reflects one approach to try and improve system performance when writing unstructured data structures. With MPI-IO collective buffering, a MPI_file_write_all( ) call provides the offset and length for every proc. It is a synchronous collective call. MPI-IO has a static collective buffer size which was set at MPI_File_open( ). The user sets the buffer size to a pre-determined file system magic number (e.g., 64K). There is also a pre-determined number of aggregator procs (subset of all procs). The non-aggregators send data to aggregators. Aggregators hopefully get a magic data size and do a fast write. However, a lot of data is potentially moved from non-aggregator to aggregators In the diagram 800, at open time, MPI-IO establish a static buffer size and the number of aggregators, and uses the aggregators for each subsequent write. Assume size is 64K and we are using five aggregators (P0, P2, P4, P6, and P8). As depicted in the diagram 800, data will be transferred between processes in order to achieve the 64K blocks for writing. For example, the aggregator process P0 will get a 64K block, 47K from P0, 10K from P1 (i.e., P1 transfers 10K to P0) and 7K from P2 (i.e., P2 transfers 7K to P0). The data ranges of the blocks for each 64K write block are depicted in FIG. 8. After all of the data has been exchanged, seven 64K write blocks and one 21K write block are created. As a result of the exchange, MPI-IO collective buffering can achieve good file system performance, but at the cost of data transfer, as more than 70% of data was transferred between processes in this example.

PLFS Collective Writing (Structured)

Figure 9:
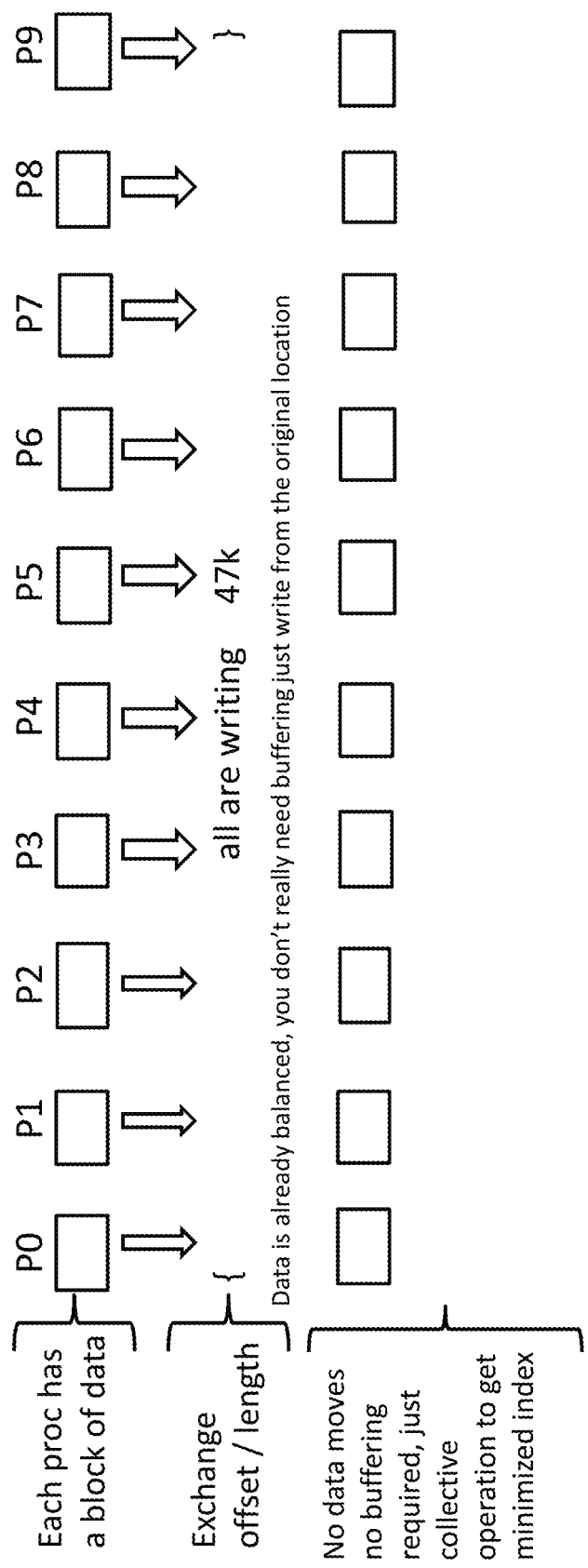
FIG. 9 is a diagram depicting PLFS collective writing (structured).

FIG. 9 is an example diagram 900 depicting PLFS collective writing, which is an example implementation of applying data pattern solutions and/or collective buffering solutions to PLFS. As depicted in the example diagram 900, all processes are writing the same amount of data (47K), for a total amount of 470K data written across the ten processes. In this example diagram 900, no data is moved.

Because all writes are the same size (47K), only one PLFS index entry needs to be created for the entire file. In a specific implementation, the following format is used for the PLFS index entry:

Number of Processes, Start Offset, Total Length, Data Per Process

Using the example depicted at 900, and the example PLFS index entry format above, the single PLFS index entry for the data write would be:

10, 0, 469K, 47K

Using this data pattern solution (e.g., using the PLFS index entry format above) can provide significant savings over using one index entry per write. For example, a single PLFS index entry could be used instead of hundreds of thousands of individual index entries (or even millions of index entries, or more).

PLFS Collective Multi-Proc Writing (Structured)

Figure 10:
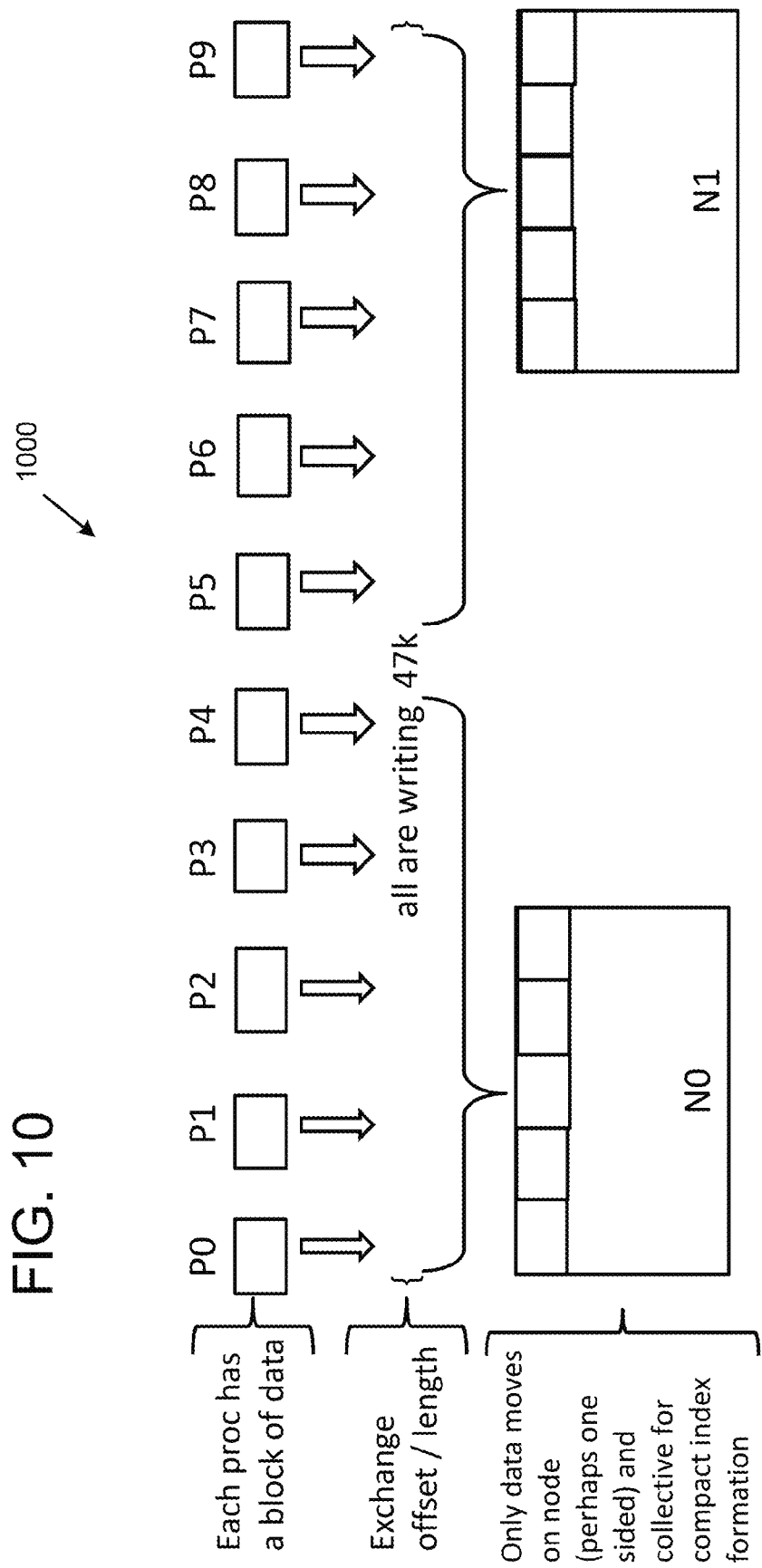
FIG. 10 is a diagram depicting PLFS collective multi-proc writing (structured).

FIG. 10 is an example diagram 1000 depicting PLFS collective multi-proc writing, which is an example implementation of applying data pattern solutions and/or collective buffering solutions to PLFS. As depicted in the example diagram 1000, all processes are writing the same amount of data (47K), for a total amount of 469K data written across the ten processes. In this example diagram 1000, data is redistributed so that 2 nodes (N0 and N1) each write half the data.

The solution depicted at 1000 uses only one index entry. PLFS collective writing provides advantages over previous MPI-IO collective buffering. For example, PLFS collective writing transfers less data than MPI-IO collective buffering, can use more write streams, and does not require knowledge of file system magic numbers. Data is rearranged not to have proper offsets in a single file using collective buffer sizes that make N to 1 work well on the file system. Instead, it is rearranged to make sure that each node writes the same amount of data (regardless of offsets), which causes balance for the file system and it causes PLFS indexing using data patterns to cost almost nothing for writing or reading.

In a specific implementation, the following format is used for the PLFS index entry (this format is similar to the one described above in the "PLFS Collective Writing (structured)" subsection, but accounts for a number of nodes writing the data):

<Number of Nodes, Start Offset, Total Length, Data Per Node>

Using the example depicted at 1000, and the example PLFS index entry format above, the single PLFS index entry for the data write by the two nodes would be:

2, 0, 469K, 235K

PLFS Collective Writing (Unstructured)

Figure 11:
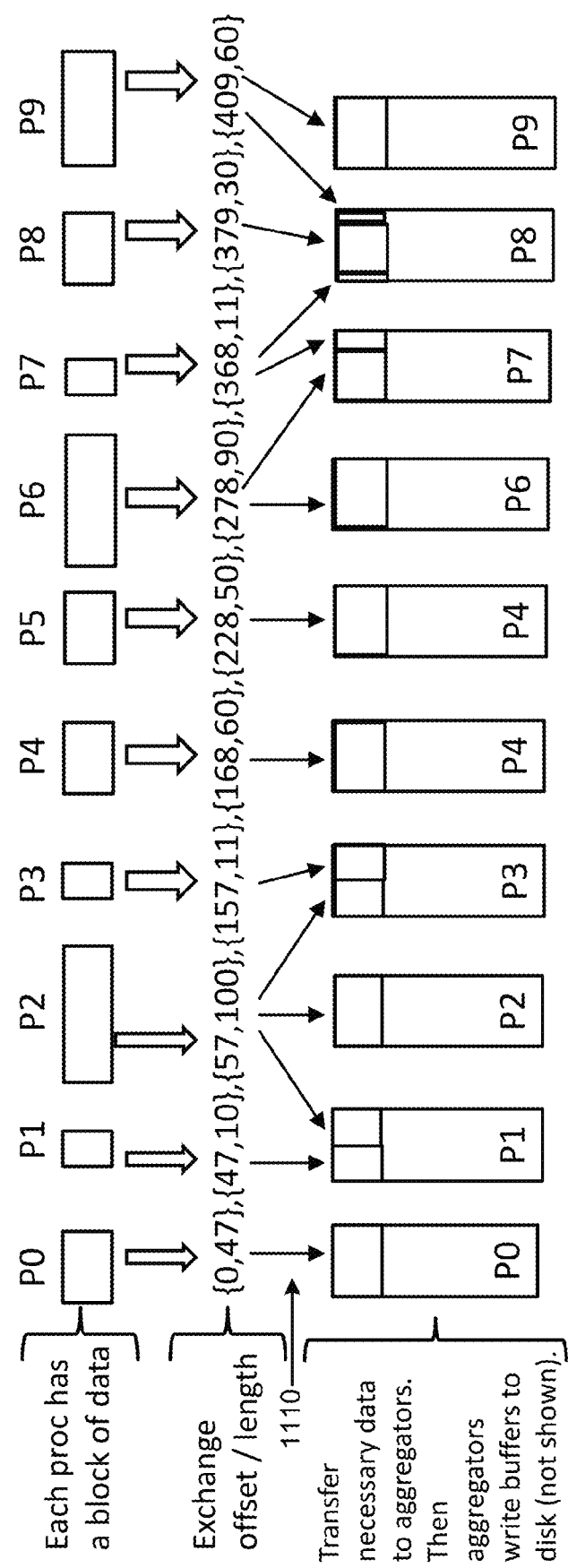
FIG. 11 is a diagram depicting PLFS collective writing (unstructured).

FIG. 11 is an example diagram 1100 depicting PLFS collective writing (unstructured), which is an example implementation of applying data pattern solutions and/or collective buffering solutions to PLFS. In contrast to FIG. 9, the processes depicted in the example diagram 1100 can write different amounts of data (e.g., length of data for P0 is 47, length of data for P1 is 10, and so on). However, with PLFS collective writing (unstructured), the data is redistributed so that all processes write the same amount of data, with the possibility of a remainder amount. As depicted at 1100, 469K total data is being written, with data being redistributed so that first 9 procs have 47K and 10th proc has leftover 46K.

In this example situation depicted at 1100, only 30% of the data needs to be moved. A simplified representation of the data movement is depicted by the arrows at 1110. Note that data is aligned to balance write, so the entire write does not need to be buffered, and much of what will be written is local in the proc (e.g., writev( ) can be used). Further, one sided operation might make it so that nothing needs to be buffered.

Furthermore, only one index entry can be created to reflect the entire write. PLFS collective writing transfers less data than MPI-IO collective buffering (e.g., than the example 70% discussed above with regard to FIG. 8), can use more write streams, and does not require knowledge of file system (FS) magic numbers. Data is rearranged not to have proper offsets in a single file using collective buffer sizes that make N to 1 work well on the file system. Instead, it is rearranged to make sure that each proc writes the same amount of data (regardless of offsets), which causes balance for the file system and it causes PLFS indexing using data patterns to cost almost nothing for writing or reading.

In a specific implementation, the following format is used for the PLFS index entry (this is the same format as described above in the "PLFS Collective Writing (structured)" subsection):

<Number of Processes, Start Offset, Total Length, Data Per Process>

Using the example depicted at 1100, and the example PLFS index entry format above, the single PLFS index entry for the data write would be:

10, 0, 469K, 47K

PLFS Collective Multi-Proc Writing (Unstructured)

Figure 12:
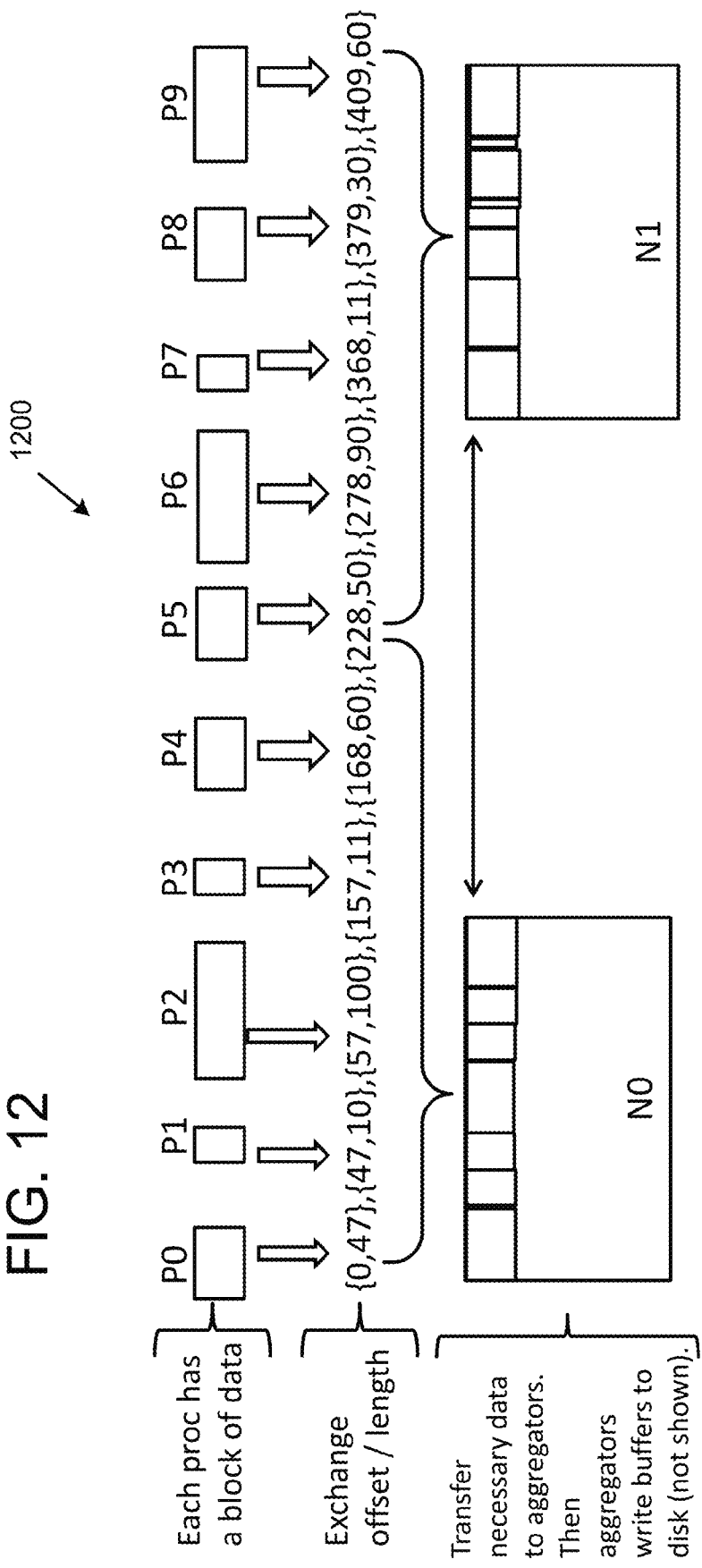
FIG. 12 is a diagram depicting PLFS collective multi-proc writing (unstructured).

FIG. 12 is an example diagram 1200 depicting PLFS collective multi-proc writing (unstructured), which is an example implementation of applying data pattern solutions and/or collective buffering solutions to PLFS. As depicted in the example diagram 1200, the processes are writing different amounts of data (e.g., P0 is writing data of length 47, P1 is writing data of length 10, and so on), for a total amount of 469K data written across the ten processes (P0 through P9). In this example diagram 1200, data is redistributed so that 2 nodes (N0 and N1) each write half the data. Note that data moved over the network is lower than MPI-IO collective buffering and even lower with Multi-Proc given that most of the data stays on node. In this example (as depicted at 1200), almost no data moves over the network.

As depicted at 1200, almost no data is moved between nodes. PLFS collective writing transfers less data than MPI-IO collective buffering, can use more write streams, and does not require knowledge of file system magic numbers. Data is rearranged not to have proper offsets in a single file using collective buffer sizes that make N to 1 work well on the file system. Instead, it is rearranged to make sure that each node writes the same amount of data (regardless of offsets), which causes balance for the file system and it causes PLFS indexing using data patterns to cost almost nothing for writing or reading.

In a specific implementation, the following format is used for the PLFS index entry (this is the same format described above in the "PLFS Collective Multi-Proc Writing (structured)"):

<Number of Nodes, Start Offset, Total Length, Data Per Node>

Using the example depicted at 1000, and the example PLFS index entry format above, the single PLFS index entry for the data write by the two nodes would be:

2, 0, 469K, 235K

Complex Type N to 1 Unstructured Pattern

Figure 13:
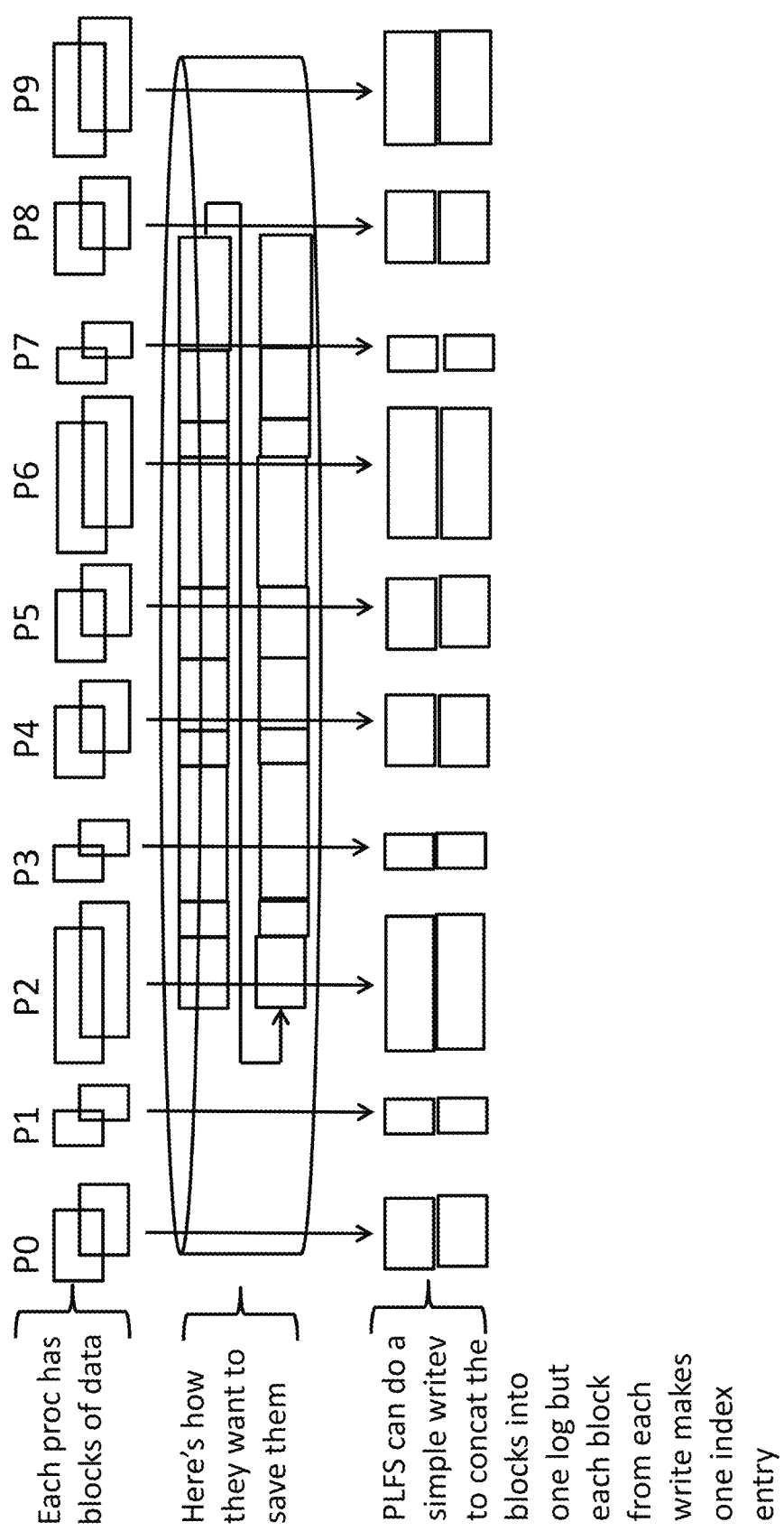
FIG. 13 is a diagram depicting a complex type N-to-1 unstructured pattern.

FIG. 13 is an example diagram 1300 depicting a complex type N-to-1 unstructured pattern. PLFS solves this by transforming transparently to N-N but at cost of large metadata which hurts read open times (i.e. one index entry per write).

Figure 14:
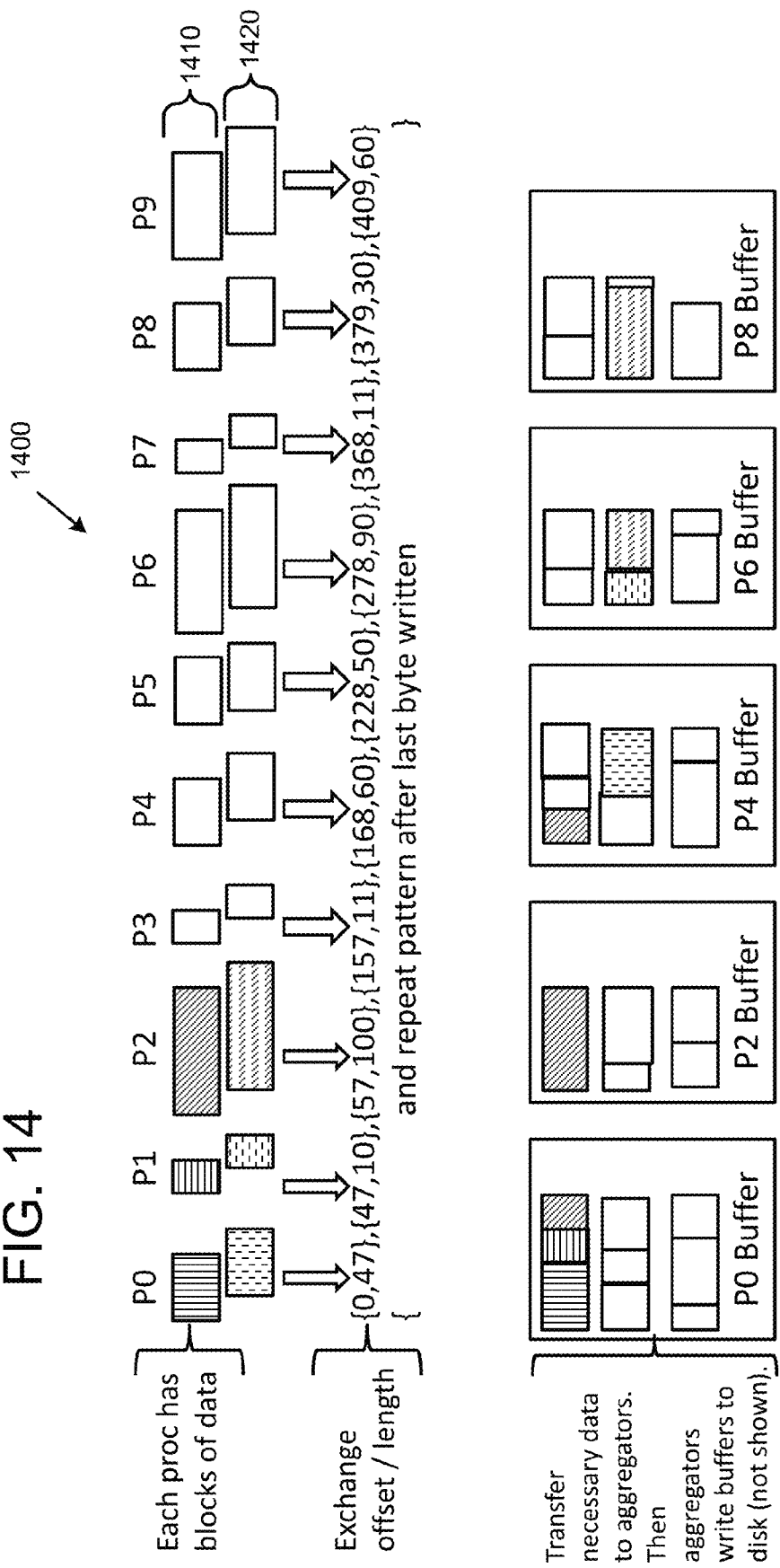
FIG. 14 is a diagram depicting MPI-IO collective buffering (complex type).

MPI-IO also has mechanism (collective buffering/two-phase IO) for this purpose. The MPI-IO (collective buffering/two-phase IO) mechanism is depicted in FIG. 14 at 1400. At open time, MPI-IO establishes a static buffer size and the number of aggregators, and uses these for each subsequent write. Assume the buffer size is 64K and we are using five aggregators (P0, P2, P4, P6, and P8). In the example depicted at 1400, there are two sets of data (a first set 1410 and a second set 1420) each 469K. MPI-IO transfers the data, starting with the first set of 469K, to the aggregators to create 64K chunks. In the example, data movement is depicted (using corresponding fill patterns) for the data of P0, P1, and P2 for the first set of data 1410. Specifically, the data for P0, P1, and part of P2 of the first set 1410 moves to the P0 buffer, another part of the data for P2 moves to the P2 buffer, and a final part of the data for P2 moves to the P4 buffer. Data movement is also depicted for the data for P0, P1, and P2 for the second set of data 1420. Specifically, the data for P0 moves to the P4 buffer, the data for P1 moves to the P6 buffer, and the data for P2 is split between the P6 buffer and the P8 buffer.

As illustrated in the example 1400, with MPI-IO and the complex type write situation, very little of the data is written by the process or node that produced the data. This means that a large percentage of the data for the write has to move over the network thus reducing efficiency.

PLFS Collective Writing Complex Type (Structured)

Figure 15:
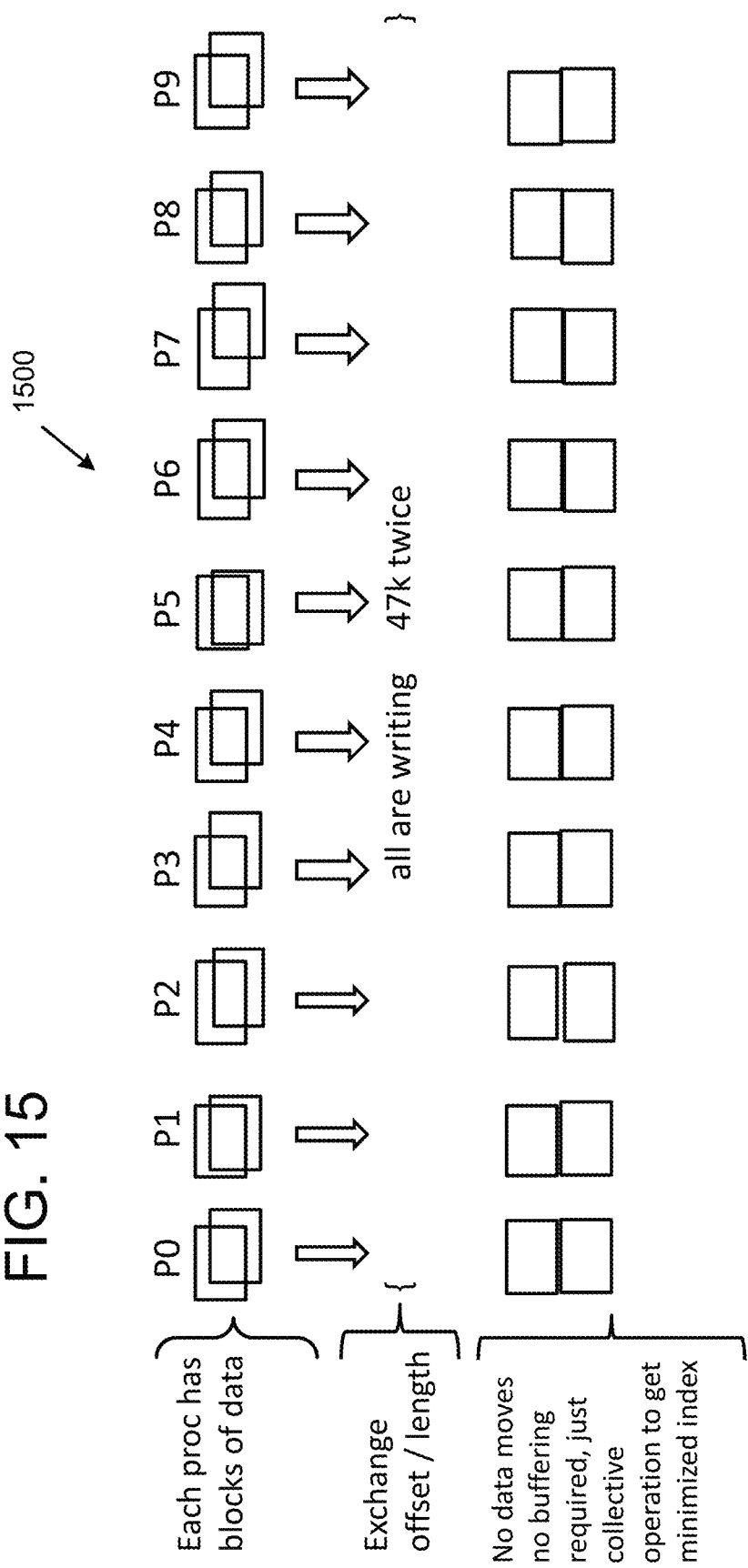
FIG. 15 is a diagram depicting PLFS collective writing complex type (structured).

FIG. 15 is an example diagram 1500 depicting PLFS collective writing complex type (structured), which is an example implementation of applying data pattern solutions and/or collective buffering solutions to PLFS. As depicted in the example diagram 1500, the processes are writing the same amount of data (structured—47K each, once for each set of writes), for a total amount of 469K data written across the ten processes (P0 through P9) for each of the two writes. All parts of the complex type can be stored together in the same log.

In this example 1500, only one index entry needs to be created using the

<Number of processes, start offset, total length, data per process> format, as follows:

10, 0, 469K, N complex types per process

PLFS Collective Multi-Proc Writing Complex Type (Structured)

Figure 16:
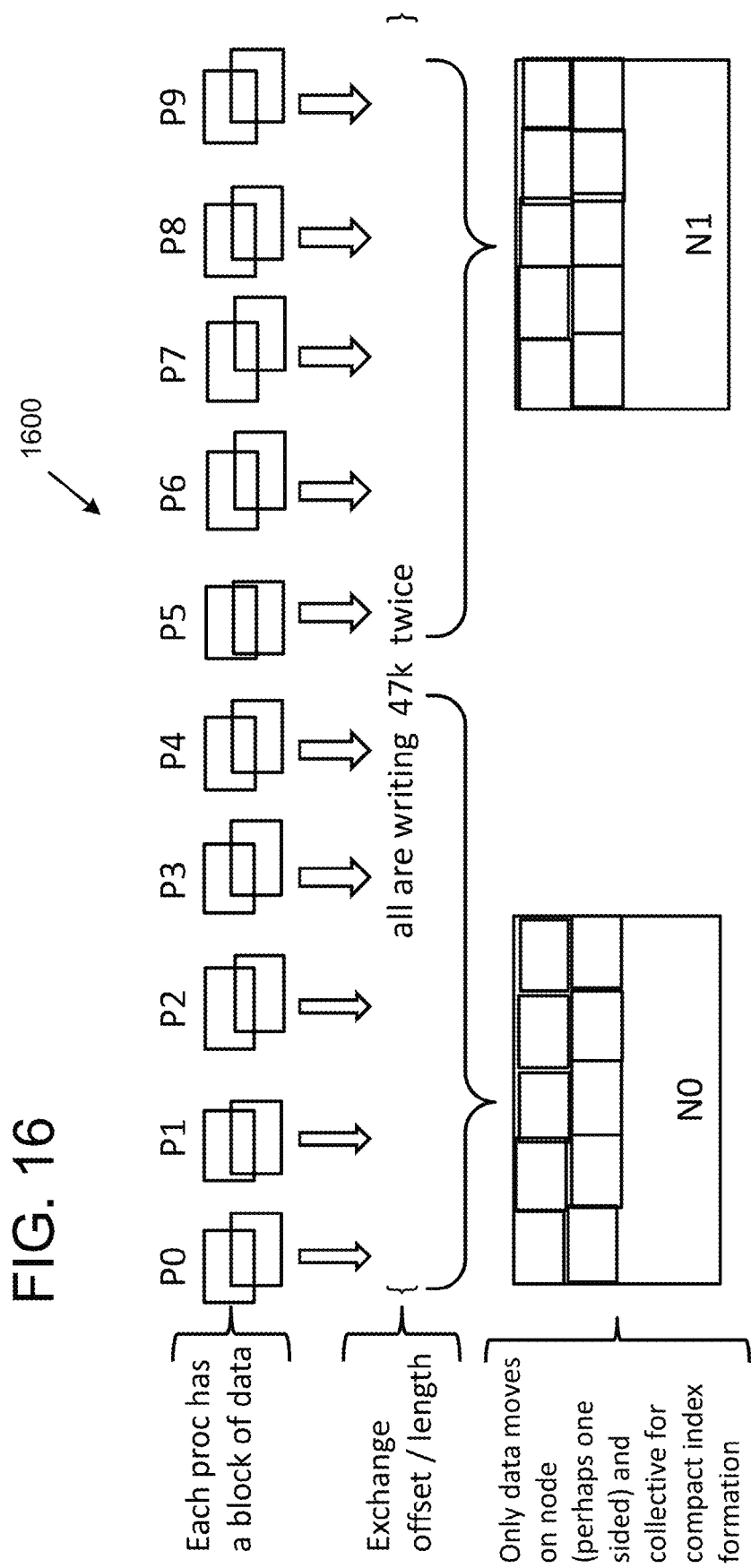
FIG. 16 is a diagram depicting PLFS collective multi-proc writing complex type (structured).

FIG. 16 is an example diagram 1600 depicting PLFS collective multi-proc writing complex type (structured), which is an example implementation of applying data pattern solutions and/or collective buffering solutions to PLFS using complex data types. As depicted in the example diagram 1600, all processes are writing the same amount of data (47K each, one for each set of writes), for a total amount of 469K data written across the ten processes for each of the two writes. In this example diagram 1600, data is redistributed so that 2 nodes (N0 and N1) each write half the data.

The example depicted at 1600, the data for processes P0 through P4, which are associated with node N0, are written by N0, while the data for processes P5 through P9, which are associated with N1, are written by N1.

As with the other PLFS collective writing solutions described herein, only one PLFS index entry needs to be created. In this example 1500, the index entry is created using the <Number of nodes, start offset, total length, data per node> format, as follows:

2, 0, 2*469K, N complex types per node

PLFS Collective Writing Complex Type (Unstructured)

Figure 17:
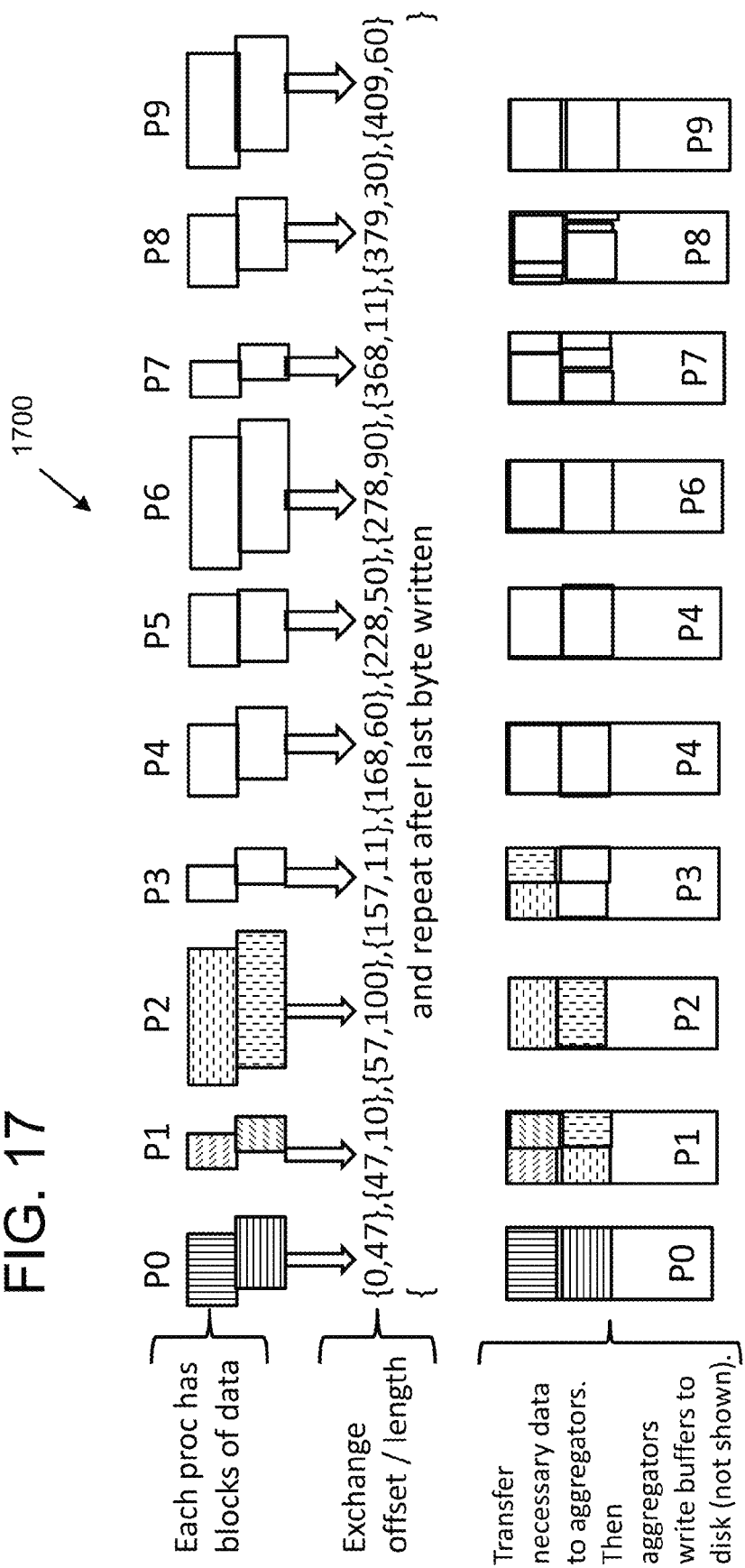
FIG. 17 is a diagram depicting PLFS collective writing complex type (unstructured).

FIG. 17 is an example diagram 1700 depicting PLFS collective writing complex type (unstructured), which is an example implementation of applying data pattern solutions and/or collective buffering solutions to PLFS. As depicted in the example diagram 1700, the processes operate on different amounts of data. However, with PLFS collective writing complex type (unstructured), the data is redistributed so that all processes write the same amount of data, with the possibility of a remainder amount. Specifically, data is redistributed such that a large portion of the data remains local to the process (e.g., with all members of the complex type in one log file, which helps with read/analysis functions).

The example diagram 1700 depicts how data is transferred between processes. Specifically, data transfer is depicted, using corresponding fill patterns, for processes P0, P1, and P2. The data for P0 remains at P0 because P0 is writing exactly 47K. The data for P1 also remains with P1 (P1 is only writing 10K per write). The data for P2, which is larger than 47K, is distributed among P1, P2, and P3. Data for the remaining processes is distributed in a similar manner.

As illustrated in the example diagram 1700, a large portion of the data stays local to the process for writing, and there is much less data movement than with MPI-IO collective buffering (e.g., see FIG. 13). In addition, PLFS collective writing complex type (unstructured) can use only one, or a few, index entries, can use more write streams, and does not require knowledge of file system magic numbers.

In this example 1700, an index entry can be created using the <Number of processes, start offset, total length, data per process> format, as follows:

10, 0, 2*469K, N complex types per process

PLFS Collective Multi-Proc Writing Complex Type (Unstructured)

Figure 18:
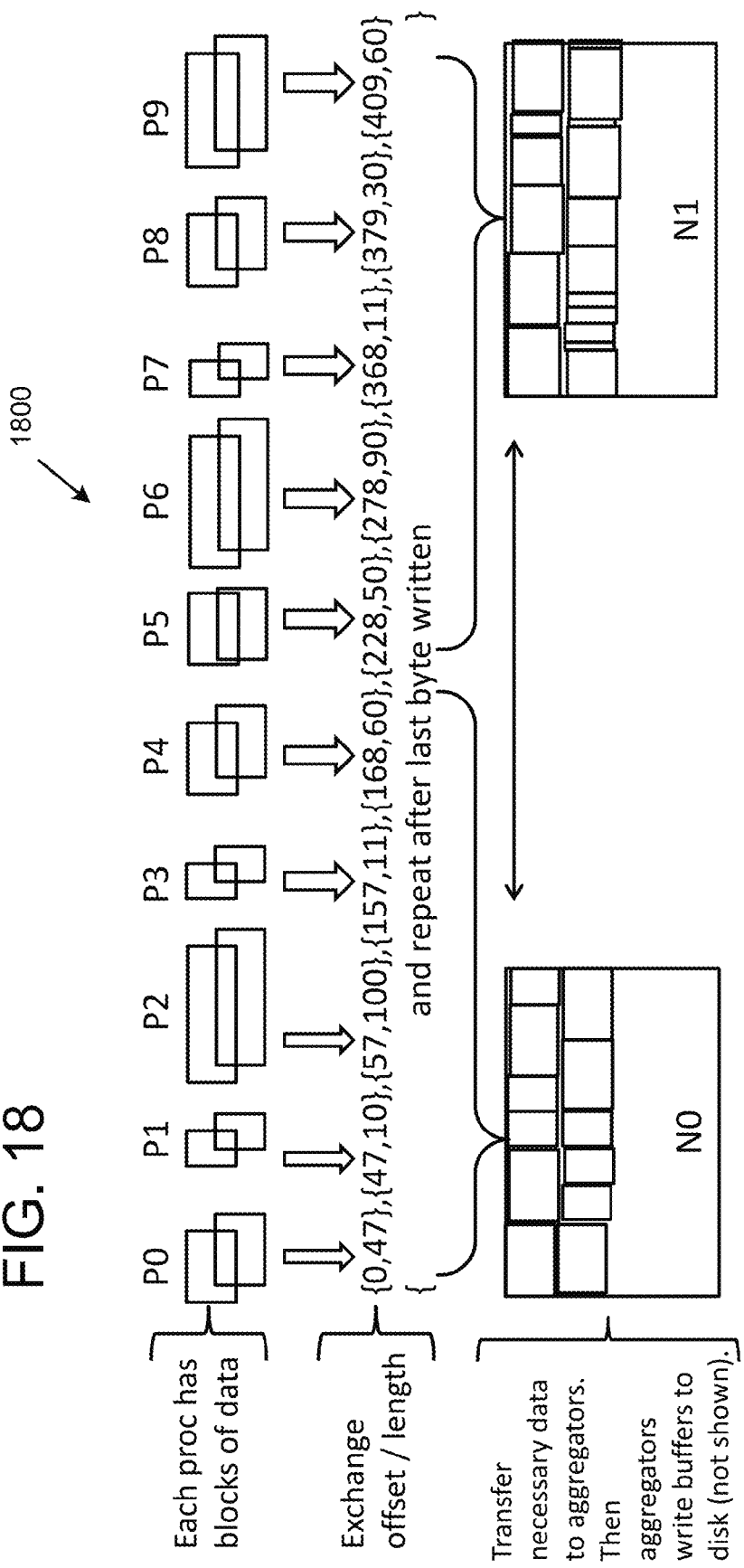
FIG. 18 is a diagram depicting PLFS collective multi-proc writing complex type (unstructured).

FIG. 18 is an example diagram 1800 depicting PLFS collective multi-proc writing complex type (unstructured), which is an example implementation of applying data pattern solutions and/or collective buffering solutions to PLFS. The example depicted at 1800 is similar to FIG. 12, but with complex types.

As depicted in the example diagram 1800, the processes are writing different amounts of data (e.g., P0 is writing data of length 47, P1 is writing data of length 10, and so on), for a total amount of 469K data written across the ten processes (P0 through P9) for each of two writes. In this example diagram 1800, data is redistributed so that 2 nodes (N0 and N1) each write half the data. Note that data moved over the network is lower than MPI-IO collective buffering and even lower with Multi-Proc given that most of the data stays on node. In this example (as depicted at 1800), almost no data moves over the network. For example, data is redistributed so that you preserve lots of data local to the process and you preserve the complex type in the same log file (e.g., with all members of the complex type in one log file, which helps with read/analysis functions)

In a specific implementation, the following format is used for the PLFS index entry (this is the same format described above in the "PLFS Collective Multi-Proc Writing (structured)"):

<Number of Nodes, Start Offset, Total Length, Data Per Node>

Using the example depicted at 1000, and the example PLFS index entry format above, the single PLFS index entry for the data write by the two nodes would be:

2, 0, 2*469K, N complex types per node

Regular MPI-IO Collectives Can't Capitalize on Structure

FIG. 19 is an example diagram 1900 depicting regular MPI-IO collectives, an illustrating their problem with reading/writing/analysis of data. In the example diagram 1900, the flow of data for process P8 is depicted using corresponding fill patterns (i.e., from P8 to the P0 and P2 buffers for the first write and then to the file, and from P8 to the P6 buffer for the second write and then to the file).

PLFS Collectives can Capitalize on Structure

FIG. 20 is an example diagram 2000 depicting PLFS collectives, which can capitalize on structure (in contrast to MPI-IO collectives, as discussed above in relation to FIG. 19).

Complex Type—Illustrated View

Figure 21:
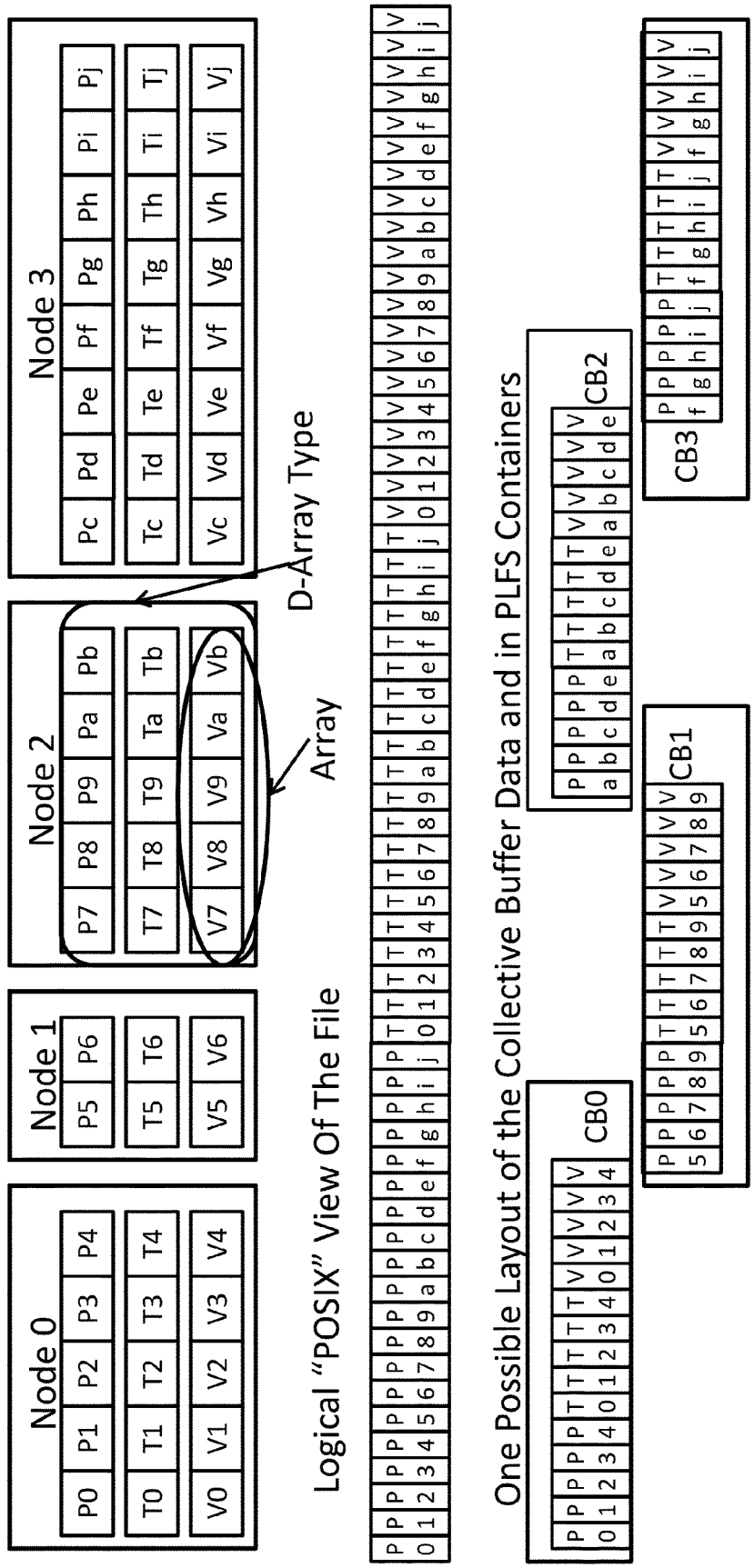
FIG. 21 is a diagram depicting an example layout of collective buffer data and PLFS containers.

FIG. 21 is an example diagram 2100 depicting an example layout of collective buffer data and PLFS containers. In the example diagram 2100, all writes can be performed in parallel.

Example Views and Layouts

Figure 22:
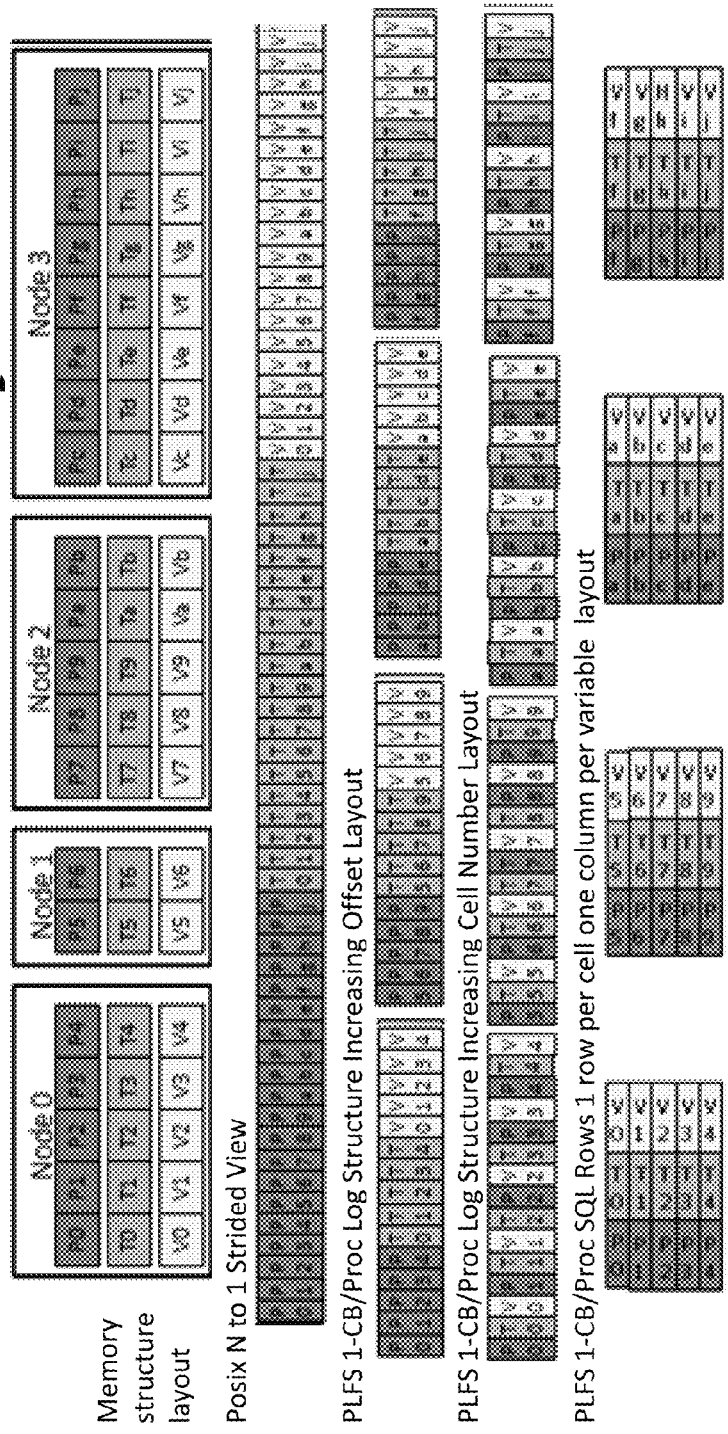
FIG. 22 is a diagram depicting example virtual views, real views, and layouts.
Figure 23:
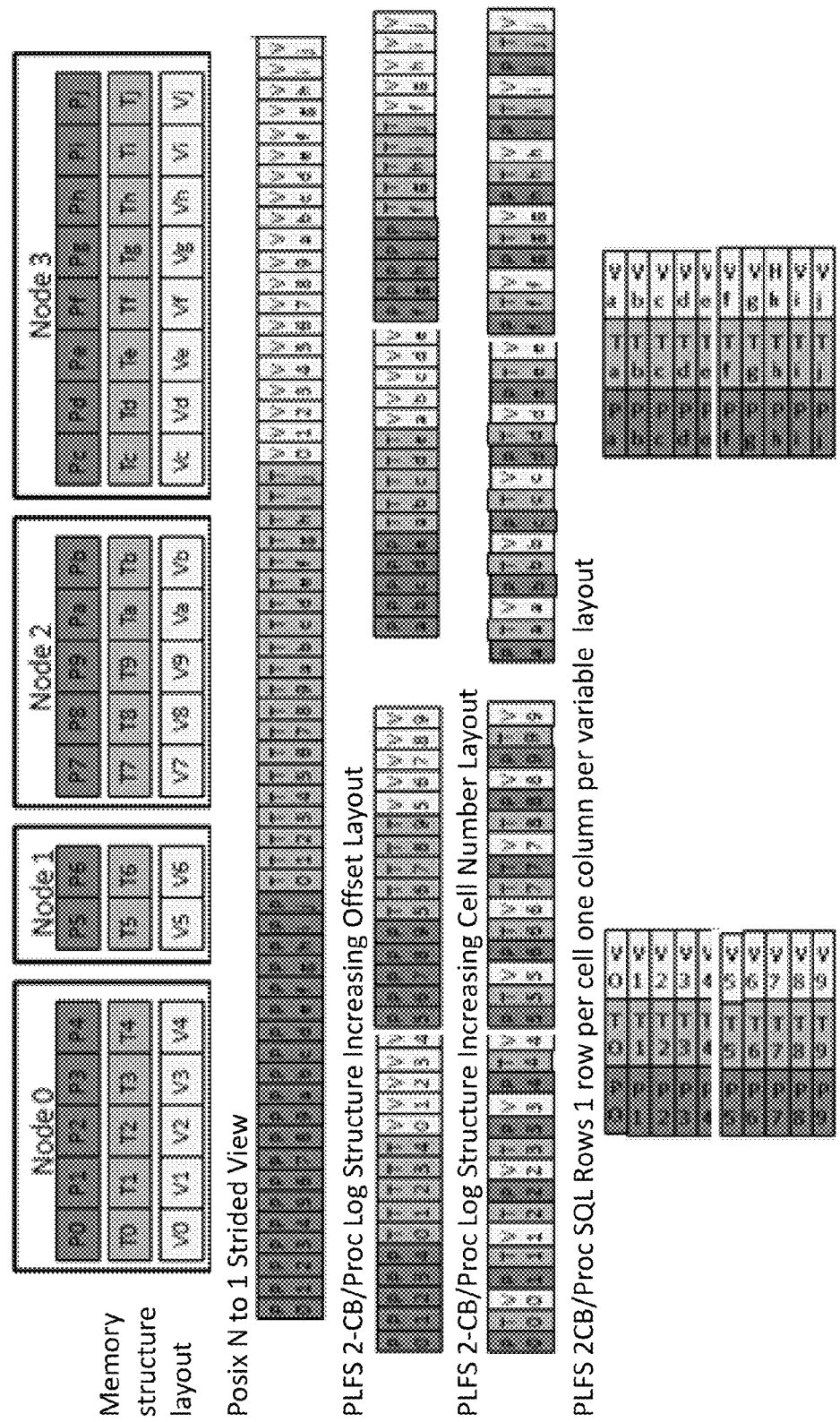
FIG. 23 is a diagram depicting example aggregated virtual views, real views, and layouts.

FIG. 22 is a diagram 2200 depicting example virtual views, real views, and layouts. FIG. 23 is a diagram 2300 depicting example aggregated virtual views, real views, and layouts. For example, a compact formula style representation can provide an efficient map between a logical view and layout(s).

Example Solution Diagram Using PLFS

Figure 24:
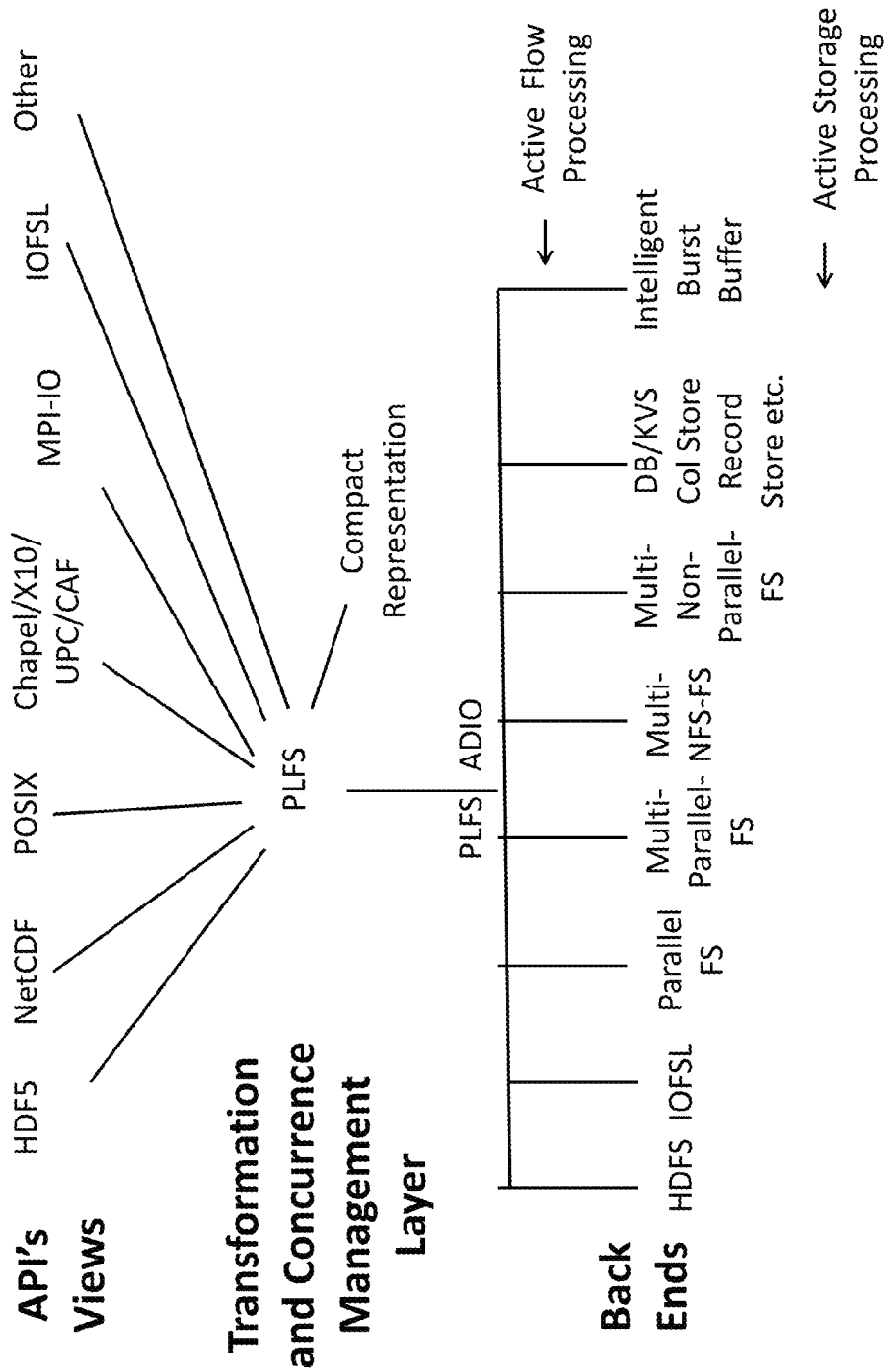
FIG. 24 depicts an example solution diagram using PLFS.

FIG. 24 depicts an example solutions diagram 2400 using PLFS, which can use the various data pattern solutions and/or collective buffering solutions described herein.

Other Applications

These techniques for pattern capture and leveraging compact representation have use in other regimes besides HPC scientific computing/simulation and in other run-times (e.g., besides MPI-IO). For example:

PGAS run time and PGAS related languages

Extreme threaded related run times

Extreme scale database generation

Dynamic graph problems are similar to unstructured meshes and suffer from similar large scale representation issues

Additional Implementations

The following are example embodiments of the techniques and solutions described herein.

In an example embodiment, a method, implemented at least in part by one or more computing devices, is provided for writing, reading, and/or analyzing data in a collective parallel processing environment using a parallel file system, the method comprising using one or more parallel log-structured file system collective buffering and/or data pattern technologies described herein to write, read, and/or analyze data.

In another example embodiment, a computer-readable storage medium storing computer-executable instructions is provided for causing a computing device to perform a method for writing, reading, and/or analyzing data in a collective parallel processing environment using a parallel file system, the method comprising using one or more parallel log-structured file system collective buffering technologies described herein to write, read, and/or analyze data.

Computing Environment

This section describes an example of a computing environment suitable for implementing the technologies described herein.

Figure 25:
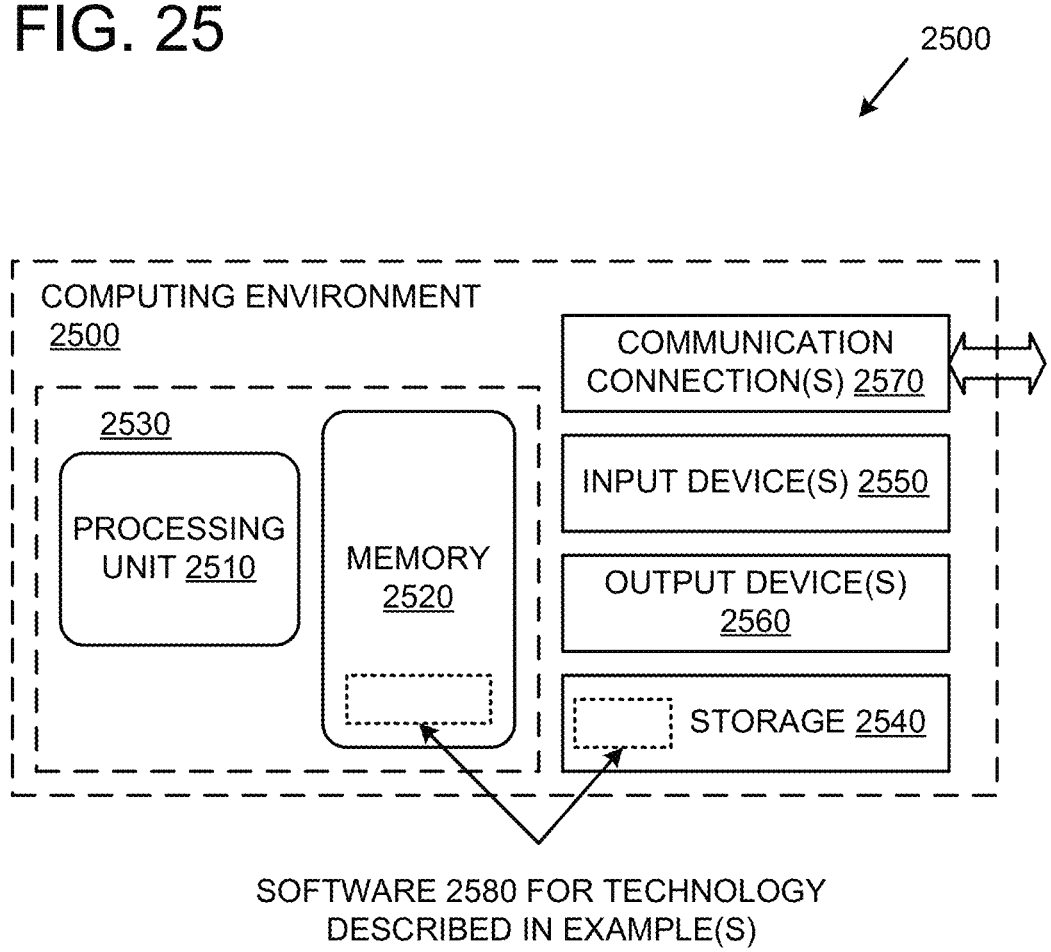
FIG. 25 is a diagram illustrating an example of a computing environment that can be used to implement any of the technologies described herein.

FIG. 25 illustrates a generalized example of a suitable computing environment 2500 in which described embodiments, techniques, and technologies may be implemented. The computing environment 2500 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems (e.g., one of which could be a cryptographic processor), microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 25, the computing environment 2500 can include at least one central processing unit 2510 and memory 2520. In FIG. 25, this basic configuration 2530 is included within a dashed line. The central processing unit 2510 executes computer-executable instructions and may be a real or a virtual processor. In a multi-processing system, multiple processing units execute computer-executable instructions to increase processing power and as such, multiple processors can be running simultaneously. The memory 2520 may be volatile memory (e.g., registers, cache, RAM), non-volatile memory (e.g., ROM, EEPROM, flash memory, etc.), or some combination of the two. The memory 2520 stores software 2580 that can, for example, implement the technologies described herein. A computing environment may have additional features. For example, the computing environment 2500 can include storage 2540, one or more input devices 2550, one or more output devices 2560, and one or more communication connections 2570. An interconnection mechanism (not shown) such as a bus, a controller, or a network, interconnects the components of the computing environment 2500. Typically, operating system software (not shown) provides an operating environment for other software executing in the computing environment 2500, and coordinates activities of the components of the computing environment 2500.

The computer-readable storage 2540 may be removable or non-removable media, and includes magnetic disks, magnetic tapes or cassettes, CD-ROMs, CD-RWs, DVDs, or any other tangible medium which can be used to store information and which can be accessed within the computing environment 2500. The storage 2540 stores instructions for the software 2580, which can implement technologies described herein.

The input device(s) 2550 may be a touch input device, such as a smartphone or tablet screen, keyboard, keypad, mouse, pen, or trackball, a voice input device, a scanning device, or another device, that provides input to the computing environment 2500. For audio, the input device(s) 2550 may be a sound card or similar device that accepts audio input in analog or digital form, or a CD-ROM reader that provides audio samples to the computing environment 2500. The output device(s) 2560 may be a display, printer, speaker, CD-writer, or another device that provides output from the computing environment 2500.

The communication connection(s) 2570 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 2520 and/or storage 2540. The term computer-readable media does not include communication connections (e.g., 2570) such as modulated data signals and carrier waves.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. We therefore claim as our invention all that comes within the scope and spirit of these claims.

We claim:

1. A method, implemented at least in part by one or more computing devices, for data storage in a collective parallel processing environment, the method comprising:
   receiving data to be written for a plurality of collective processes within a collective parallel processing environment;
   before the data is written, extracting a data pattern for the data to be written for the plurality of collective processes;
   generating a representation describing the data pattern; and
   saving the data and the representation of the data pattern;
   wherein the representation is a single index entry, and wherein the representation describing the data pattern comprises information describing:
      a number of the plurality of collective processes;
      an offset in files being written when saving the data;
      a total amount of data being written; and
      an amount of data being written per collective process.

2. The method of claim 1, wherein the plurality of collective processes are organized into a plurality of compute nodes, and wherein the data to be written is received from each compute node.

3. The method of claim 1, wherein the data is structured data, wherein each collective process of the plurality of collective processes writes its respective data.

4. The method of claim 3, wherein the data and the representation are saved using Parallel Log-structured File System (PLFS).

5. The method of claim 1, wherein the data is unstructured data, wherein each collective process of the plurality of collective processes writes its respective data.

6. The method of claim 5, further comprising:
   before extracting the data pattern, shuffling data between neighboring collective processes of the plurality of collective processes such that the data pattern is more easily extracted.

7. The method of claim 1, further comprising:
   applying collective buffering techniques to create structured data across the plurality of collective processes.

8. The method of claim 1, further comprising:
   determining that data to be written for the plurality of collective processes is unstructured data;
   based on the determining, shuffling data between neighboring collective processes to create structured data, wherein the data pattern is extracted based on the structured data.

9. The method of claim 1, further comprising:
   determining that data to be written for the plurality of collective processes is unstructured data;
   based on the determining, shuffling data between neighboring compute nodes to create structured data, wherein the data pattern is extracted based on the structured data, and wherein the data is stored using PLFS in a number of physical files corresponding to the number of compute nodes.

10. The method of claim 1, further comprising:
    determining that data to be written for the plurality of collective processes is unstructured data;
    based on the determining, shuffling data between neighboring collective processes to create structured data, wherein the structured data for each collective process has the same number of bytes or the same number of complex structures, except for a remainder which is written by a last collective process.

11. The method of claim 1, wherein the plurality of collective processes are organized into a plurality of compute nodes, and wherein the data to be written is moved between neighboring compute nodes such that a same size of data to be written is received from each compute node, except for a last compute node from which a remainder of less than the same size of data may be received.

12. The method of claim 1, wherein the representation comprises information describing a structure of the data across the plurality of collective processes, wherein the structure of the data comprises an indication of a data type of the data.

13. A non-transitory computer-readable storage medium storing computer-executable instructions for causing a computing device to perform a method for data storage in a collective parallel processing environment, the method comprising:
    receiving data to be written for a plurality of collective processes within a collective parallel processing environment;
    before the data is written, extracting a data pattern for the data to be written for the plurality of collective processes;
    generating a representation describing the data pattern; and
    saving the data and the representation of the data pattern;
    wherein the representation is a single index entry, and wherein the representation describing the data pattern comprises information describing:
       a number of the plurality of collective processes;
       an offset in files being written when saving the data;
       a total amount of data being written; and
       an amount of data being written per collective process.

14. A high-performance parallel processing computing environment comprising:
    one or more computing devices comprising processing units and memory;
    the one or more computing devices configured to perform operations comprising:
       receiving data to be written for a plurality of collective processes within the parallel processing computing environment;
       before the data is written, extracting a data pattern for the data to be written for the plurality of collective processes;
       generating a representation describing the data pattern; and
       saving the data and the representation of the data pattern, wherein the data and the representation are saved using Parallel Log-structured File System (PLFS);
       wherein the representation is a single index entry, and wherein the representation describing the data pattern comprises information describing:
          a number of the plurality of collective processes;
          an offset in files being written when saving the data;
          a total amount of data being written; and
          an amount of data being written per collective process.

15. The high-performance parallel processing computing environment of claim 14, wherein the plurality of collective processes are organized into a plurality of compute nodes, and wherein the data to be written is received from each compute node.

16. The high-performance parallel processing computing environment of claim 14, wherein the data is structured data, wherein each collective process of the plurality of collective processes writes its respective data.

17. The high-performance parallel processing computing environment of claim 14, wherein the data is unstructured data, wherein each collective process of the plurality of collective processes writes its respective data.

18. The high-performance parallel processing computing environment of claim 17, the operations further comprising:
   before extracting the data pattern, shuffling data between neighboring collective processes of the plurality of collective processes such that the data pattern is more easily extracted.

19. The high-performance parallel processing computing environment of claim 14, the operations further comprising:
   determining that data to be written for the plurality of collective processes is unstructured data;
   based on the determining, shuffling data between neighboring collective processes to create structured data, wherein the data pattern is extracted based on the structured data.

* * * * *